(12) United States Patent
Takano et al.

(10) Patent No.: US 12,130,544 B2
(45) Date of Patent: Oct. 29, 2024

(54) LIGHT-SOURCE OPTICAL SYSTEM, LIGHT-SOURCE DEVICE, AND IMAGE DISPLAY APPARATUS

(71) Applicants: Yohei Takano, Kanagawa (JP); Kasumi Nakamura, Kanagawa (JP); Makoto Hirakawa, Tokyo (JP)

(72) Inventors: Yohei Takano, Kanagawa (JP); Kasumi Nakamura, Kanagawa (JP); Makoto Hirakawa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 216 days.

(21) Appl. No.: 17/772,143

(22) PCT Filed: Oct. 28, 2020

(86) PCT No.: PCT/IB2020/060069
§ 371 (c)(1),
(2) Date: Apr. 27, 2022

(87) PCT Pub. No.: WO2021/105790
PCT Pub. Date: Jun. 3, 2021

(65) Prior Publication Data
US 2022/0382137 A1 Dec. 1, 2022

(30) Foreign Application Priority Data
Nov. 29, 2019 (JP) .................. 2019-217523

(51) Int. Cl.
*G03B 21/20* (2006.01)
*G02B 26/00* (2006.01)
*G03B 21/00* (2006.01)

(52) U.S. Cl.
CPC ......... *G03B 21/204* (2013.01); *G02B 26/008* (2013.01); *G03B 21/008* (2013.01);
(Continued)

(58) Field of Classification Search
CPC .................. G03B 21/204; G03B 21/008; G03B 21/2013; G03B 21/2066; G03B 21/2073; G03B 33/08; G02B 26/008; G02B 27/141
See application file for complete search history.

(56) References Cited

U.S. PATENT DOCUMENTS

2013/0322056 A1* 12/2013 Konuma .............. F21V 13/14
362/84
2014/0293232 A1 10/2014 Tanaka et al.
(Continued)

FOREIGN PATENT DOCUMENTS

CN 101799583 A 8/2010
CN 103901707 A 7/2014
(Continued)

OTHER PUBLICATIONS

Office Action issued Jun. 6, 2023 in Japanese Patent Application No. 2019-217523 and computer-generated English translation, 7 pages.
(Continued)

*Primary Examiner* — Magda Cruz
(74) *Attorney, Agent, or Firm* — XSENSUS LLP

(57) ABSTRACT

A light-source optical system includes a wavelength converter on which light of first color is incident, the wavelength converter converting at least a part of the light of first color into light of second color different from the light of first color, a first optical system disposed upstream from the wavelength converter on an optical path of the light of first color, the first optical system including optical elements, a reflection plane disposed downstream from the first optical system on the optical path, and a second optical system disposed downstream from the reflection plane on the optical path. The reflection plane reflects one of the light of first color and the light of second color, and a conditional expression $0<\Delta L/D<0.2$ is satisfied.

16 Claims, 19 Drawing Sheets

(52) U.S. Cl.
 CPC ..... *G03B 21/2013* (2013.01); *G03B 21/2066* (2013.01); *G03B 21/2073* (2013.01)

(56) References Cited

U.S. PATENT DOCUMENTS

| | | |
|---|---|---|
| 2015/0222864 A1 | 8/2015 | Inoko |
| 2015/0226389 A1 | 8/2015 | Kasugai et al. |
| 2015/0267880 A1 | 9/2015 | Hadrath et al. |
| 2015/0308636 A1 | 10/2015 | Daniels |
| 2016/0085141 A1 | 3/2016 | Hu et al. |
| 2016/0091784 A1 | 3/2016 | Hu et al. |
| 2016/0349606 A1 | 12/2016 | Nishimori et al. |
| 2017/0097560 A1 | 4/2017 | Matsubara et al. |
| 2017/0153538 A1 | 6/2017 | Kawasumi |
| 2018/0284586 A1 | 10/2018 | Yang et al. |
| 2019/0331990 A1 | 10/2019 | Zhang et al. |
| 2020/0064719 A1 | 2/2020 | Nakamura et al. |
| 2020/0301260 A1 | 9/2020 | Takano et al. |
| 2020/0301266 A1* | 9/2020 | Nakamura ............ G03B 21/204 |
| 2021/0389652 A1* | 12/2021 | Takano .............. G03B 21/2066 |

FOREIGN PATENT DOCUMENTS

| | | |
|---|---|---|
| CN | 104020635 A | 9/2014 |
| CN | 104769497 A | 7/2015 |
| CN | 104820335 A | 8/2015 |
| CN | 105158913 A | 12/2015 |
| CN | 105301879 A | 2/2016 |
| CN | 106133596 A | 11/2016 |
| CN | 106842789 A | 6/2017 |
| CN | 107436529 A | 12/2017 |
| CN | 109143746 A | 1/2019 |
| CN | 208367333 U | 1/2019 |
| CN | 110107827 A | 8/2019 |
| DE | 102014222130 A1 | 5/2016 |
| JP | 2012-078488 | 4/2012 |
| JP | 2013-250285 | 12/2013 |
| JP | 2014-075221 | 4/2014 |
| JP | 2014-095914 A | 5/2014 |
| JP | 2014-209184 A | 11/2014 |
| JP | 2018-173638 A | 11/2018 |
| JP | 2020-086261 | 6/2020 |
| WO | 2014/102907 A1 | 7/2014 |
| WO | 2016/016076 A1 | 2/2016 |
| WO | WO 2019/061823 A1 | 4/2019 |

OTHER PUBLICATIONS

Chinese Office Action issued Oct. 28, 2023, in corresponding Chinese Patent Application No. 202080081936.5, 19pp.
International Search Report issued on Jan. 25, 2021 in PCT/IB2020/060069 filed on Oct. 28, 2020, 11 pages.
Office Action issued Aug. 7, 2024 in Chinese Patent Application No. 202080081936.5, 4 pages.

* cited by examiner

FIG. 13
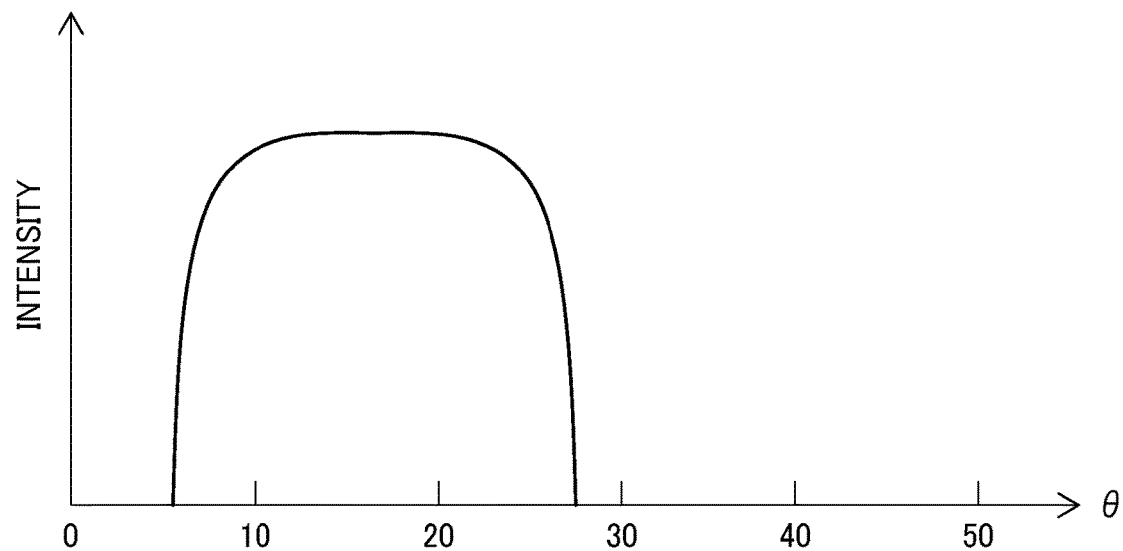
FIG. 14
SHAPE OF SPOT ON PHOSPHOR WHEEL
SHAPE OF SPOT AT ENTRANCE OF LIGHT TUNNEL
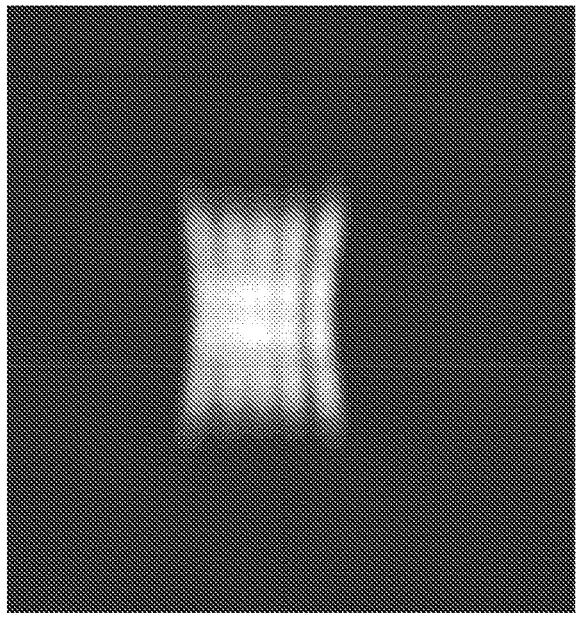
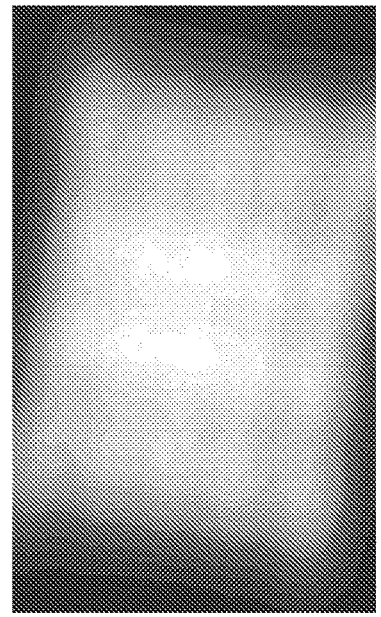

FIG. 15
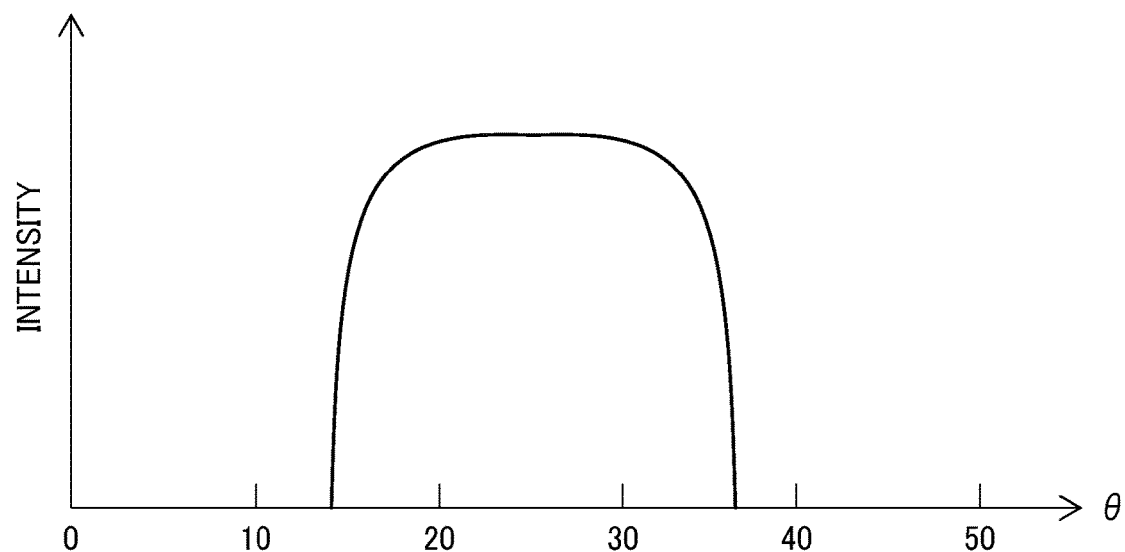
FIG. 16
SHAPE OF SPOT ON PHOSPHOR WHEEL
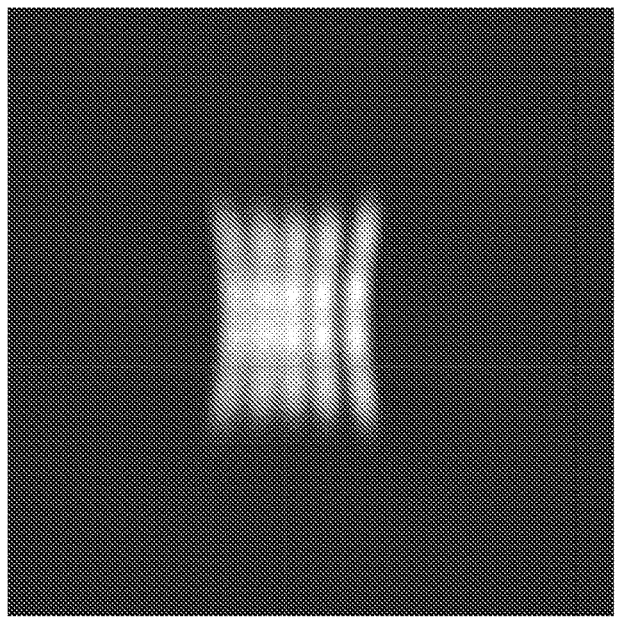
SHAPE OF SPOT AT ENTRANCE OF LIGHT TUNNEL
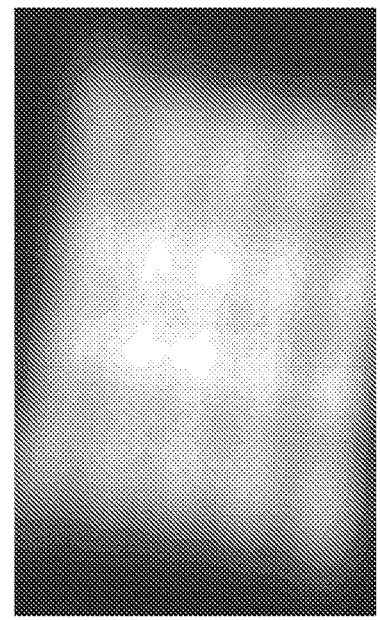

FIG. 17
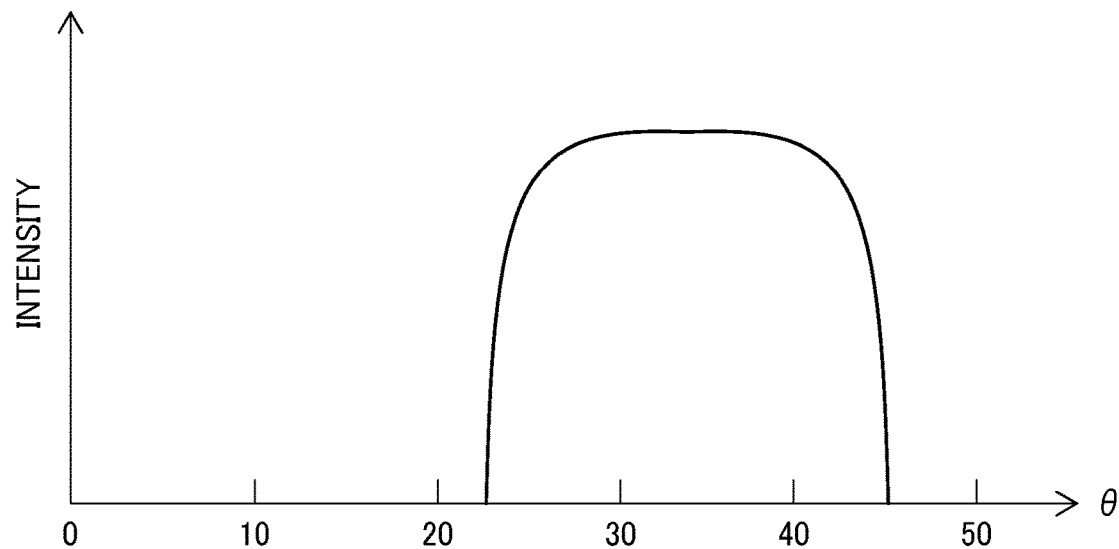
FIG. 18
SHAPE OF SPOT ON PHOSPHOR WHEEL
SHAPE OF SPOT AT ENTRANCE OF LIGHT TUNNEL
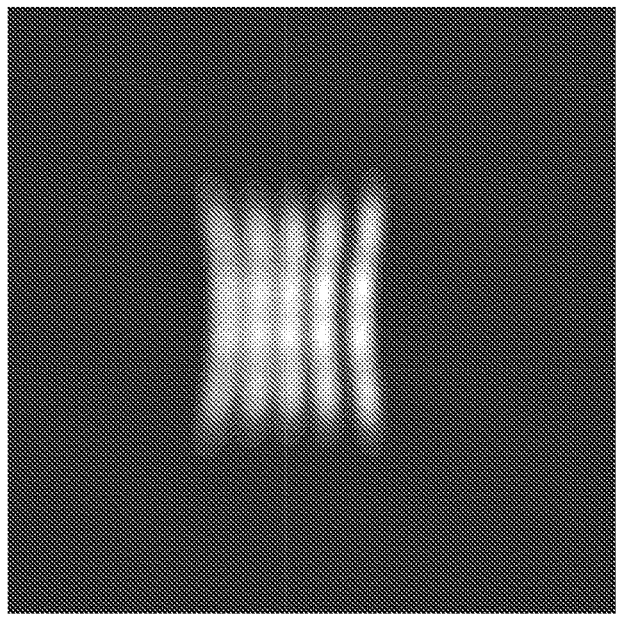
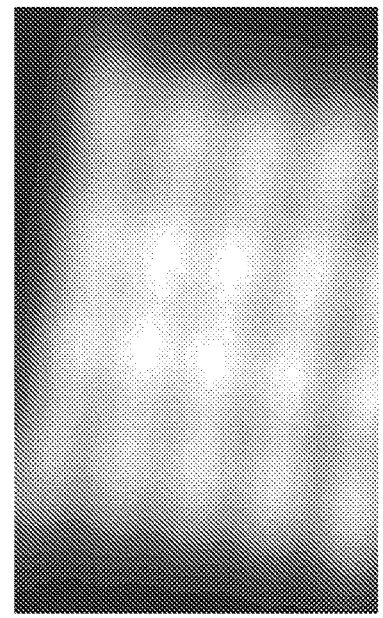

SHAPE OF SPOT AT
ENTRANCE OF LIGHT TUNNEL

SHAPE OF SPOT AT
ENTRANCE OF LIGHT TUNNEL

FIG. 26
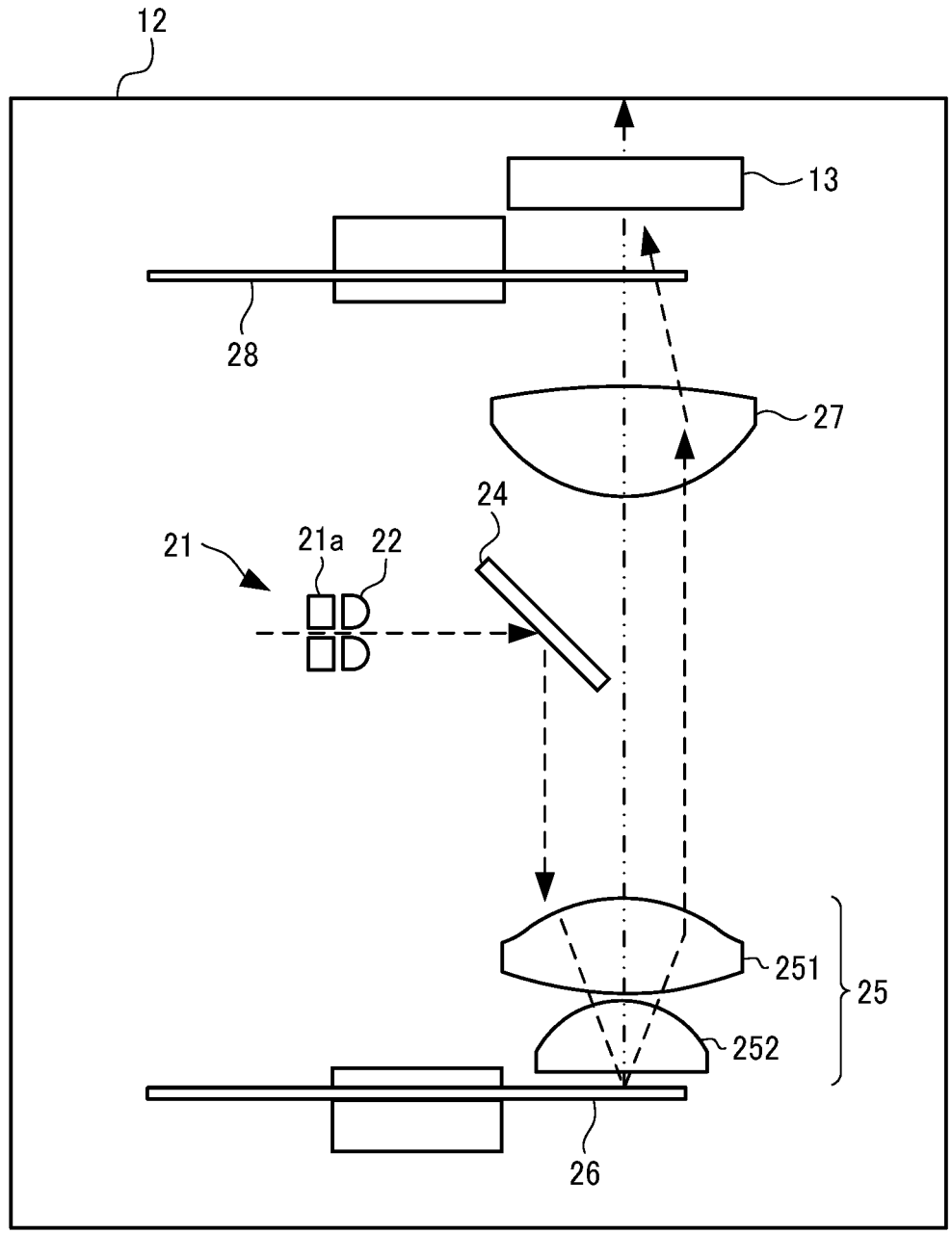
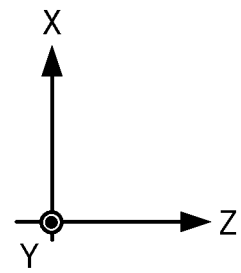

LIGHT-SOURCE OPTICAL SYSTEM, LIGHT-SOURCE DEVICE, AND IMAGE DISPLAY APPARATUS

CROSS-REFERENCE TO RELATED APPLICATION

The present application is based on PCT filing PCT/IB2020/060069, filed Oct. 28, 2020, which claims priority to Japanese Patent Application 2019-217523, filed Nov. 29, 2019, the entire contents of which is incorporated herein by reference.

TECHNICAL FIELD

Embodiments of the present disclosure relate to a light-source optical system, a light-source device, and an image display apparatus.

BACKGROUND ART

Currently, projectors or the like that magnify and project various kinds of images or moving images are widely known in the art as an image projection apparatus or an image display apparatus.

For example, projectors are known in the art that are configured to focus the light emitted by a light source onto a screen as an image as the light is transmitted through or reflected by a spatial-light modulation element such as a digital micromirror device (DMD) and a liquid crystal display.

In such known projectors, a laser beam source or a light-emitting diode (LED) light source is used as the light source of an image projection apparatus (see, for example, PTL 1, PTL 2, and PTL 3).

Currently, in a light-source device provided with a laser beam source, it is desired that the size of a light-source optical system be reduced and the efficiency of the light-source optical system be improved.

CITATION LIST

Patent Literature

[PTL 1]
  Japanese Patent Application Publication No. 2012-078488
[PTL 2]
  Japanese Patent Application Publication No. 2013-250285
[PTL 3]
  Japanese Patent Application Publication No. 2014-075221

SUMMARY OF INVENTION

Technical Problem

Embodiments of the present disclosure are provided in view of such circumstances, and aim at providing a light-source optical system provided with an excitation light source, where the efficiency can be improved and the size can be reduced.

Solution to Problem

A light-source optical system includes a wavelength converter on which light of first color is incident, the wavelength converter being configured to convert at least a part of the light of first color into light of second color different from the light of first color, a first optical system disposed upstream from the wavelength converter on an optical path of the light of first color, the first optical system including a plurality of optical elements, a reflection plane disposed downstream from the first optical system on the optical path, and a second optical system disposed downstream from the reflection plane on the optical path, the second optical system including a plurality of optical elements and having a positive power as a whole. In the light-source optical system, the reflection plane reflects one of the light of first color and the light of second color, and a conditional expression "$0<\Delta L/D<0.2$" is satisfied. In the conditional expression, P denotes a first point of intersection of an optical axis of at least one of the plurality of optical elements that together configure the first optical system and a plane (A) including the reflection plane, Q denotes a second point of intersection of an optical axis of the second optical system and the plane (A) including the reflection plane, $\Delta L$ denotes a distance between P and Q in a direction orthogonal to the optical axis of the second optical system, and D denotes an external diameter of one of the plurality of optical elements disposed on an incident side of the second optical system.

Advantageous Effects of Invention

According to one aspect of the present disclosure, the efficiency of a light-source optical system that adopts an excitation light source can be improved, and the size of such a light-source optical system can be reduced.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 13 is a diagram illustrating an intensity distribution of the laser beams of excitation light depending on the varying angle of incidence, according to a first numerical example the present disclosure.

FIG. 14 is a diagram illustrating a spot shape of laser beams incident on a wavelength converter and a spot shape of laser beams at the entrance of a light mixing element, according to the first numerical example of the present disclosure.

FIG. 15 is a diagram illustrating an intensity distribution of the laser beams of excitation light depending on the varying angle of incidence, according to a second numerical example the present disclosure.

FIG. 16 is a diagram illustrating a spot shape of laser beams incident on a wavelength converter and a spot shape of laser beams at the entrance of a light mixing element, according to the second numerical example of the present disclosure.

FIG. 17 is a diagram illustrating an intensity distribution of the laser beams of excitation light depending on the varying angle of incidence, according to a third numerical example the present disclosure.

FIG. 18 is a diagram illustrating a spot shape of laser beams incident on a wavelength converter and a spot shape of laser beams at the entrance of a light mixing element, according to the third numerical example of the present disclosure.

FIG. 26 is a diagram illustrating a configuration of a light-source optical system according to a ninth numerical example of the present disclosure.

DESCRIPTION OF EMBODIMENTS

Embodiments of an image projection apparatus and a light-source optical system that is used for an image projection apparatus are described below with reference to the accompanying drawings.

Figure 1:
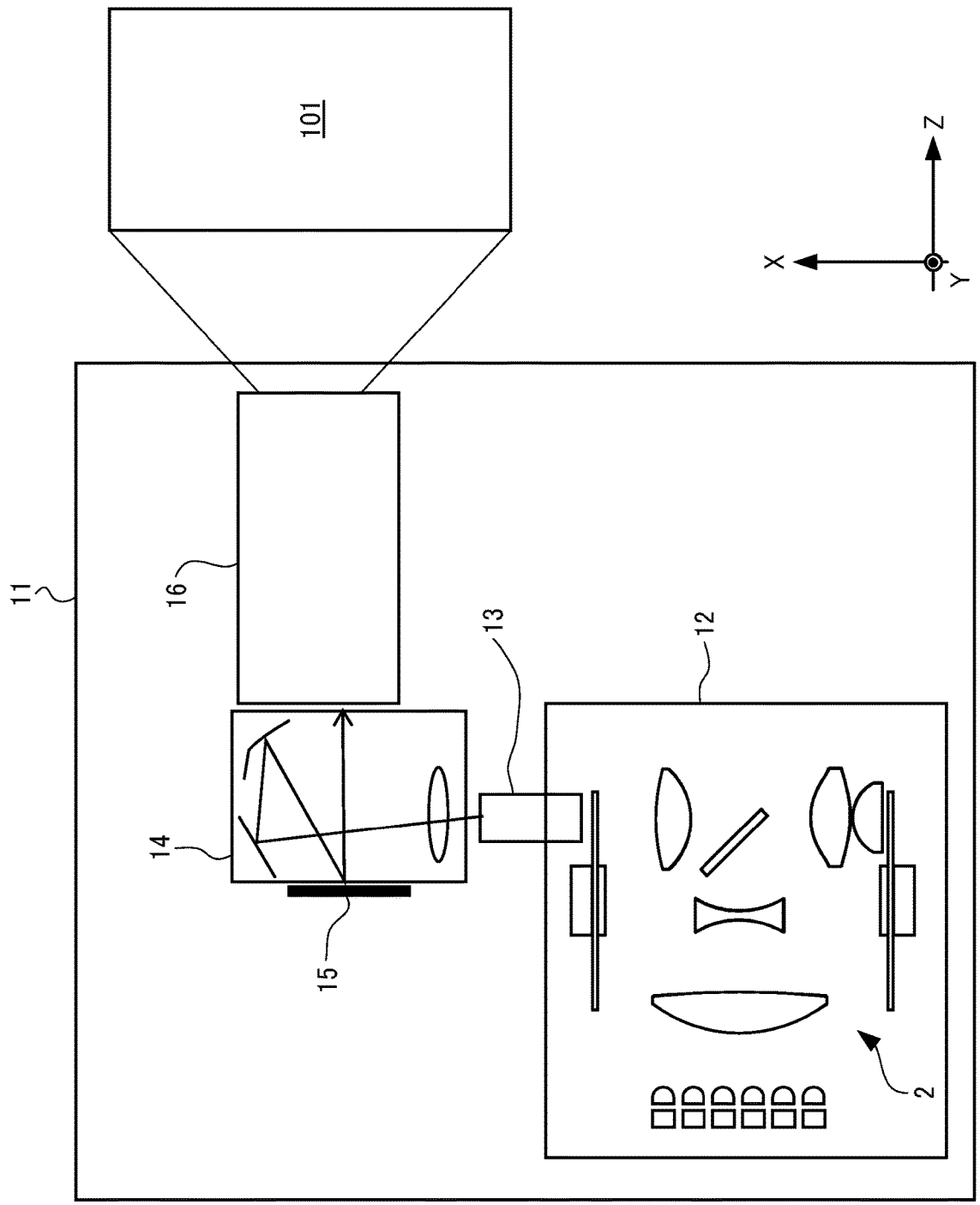
FIG. 1 is a schematic diagram illustrating a configuration of an image projection apparatus according to embodiments of the present disclosure.

In an embodiment of the present disclosure, as illustrated in FIG. 1, a projector 11 that serves as an image display apparatus or an image projection apparatus includes a light-source device 12, a light mixing element 13, a digital micromirror device (DMD) 15, an illumination optical system 14, and a projection optical system 16. The light-source device 12 is provided with a light-source optical system 2. The light mixing element 13 performs leveling on the light emitted from the light-source device 12. The illumination optical system 14 is an optical system that adjusts the light that is emitted from the light-source device 12 to the DMD 15. The DMD 15 is a spatial-light modulation element that forms an image. The projection optical system 16 magnifies the light that is modulated by the DMD 15 and forms an image, and projects the light onto a screen 101.

The light mixing element 13 is an optical element in which a light tunnel is used to mix the incident light and level the illuminance. The light tunnel is configured by a combination of four mirrors. In the light mixing element 13 according to the present embodiment, a light tunnel whose slot size at the entrance is 3.4 millimeters (mm)×5.7 mm is used. However, no limitation is intended thereby, and the light mixing element 13 may be composed of, for example, a rod integrator and a fly-eye lens. The slot size at the entrance is also not limited to the above configuration.

The illumination optical system 14 is an optical system that adjusts the light for the DMD 15.

The DMD 15 is a digital micromirror device is configured as a display element in which a large number of minute specular surfaces (micromirrors) are arrayed on a plane. The DMD 15 serves as a reflective image forming element in which each one of the minute specular surfaces is driven in response to the irradiation to form an image by reflection. In the present embodiment, the DMD 15 is adopted as a spatial-light modulation element that adds image data to the light. However, no limitation is indicated thereby, and for example, a transmissive liquid crystal panel and a reflective liquid crystal pane may be adopted.

The projection optical system 16 magnifies and projects, on a screen 101 that serves as a projection plane, the light to which image data is added by the DMD 15. The projection optical system 16 includes, for example, at least one lens.

The meaning of each symbol in a plurality of numerical examples, as will be described later, is defined as follows.

R: Radius of curvature, i.e., paraxial radius of curvature for aspherical surface
D: Surface spacing
Nd: Refractive index vd: Abbe number
K: Conic constant of aspherical surface
Ai: i-th aspheric constant The aspherical shape can be expressed as in a first mathematical expression given below. In the first mathematical expression, C denotes the inverse number of the paraxial radius of curvature R, H denotes the height from the optical axis, K denotes the conic constant of an aspherical surface, and Ai denotes the i-th aspheric constant.

$$X = \frac{C \cdot H^2}{1 + \sqrt{(1 - (1+K) \cdot C^2 \cdot H^2)}} + \sum_{i=1} Ai \cdot H^i \quad \text{[Math. 1]}$$

Figure 2:
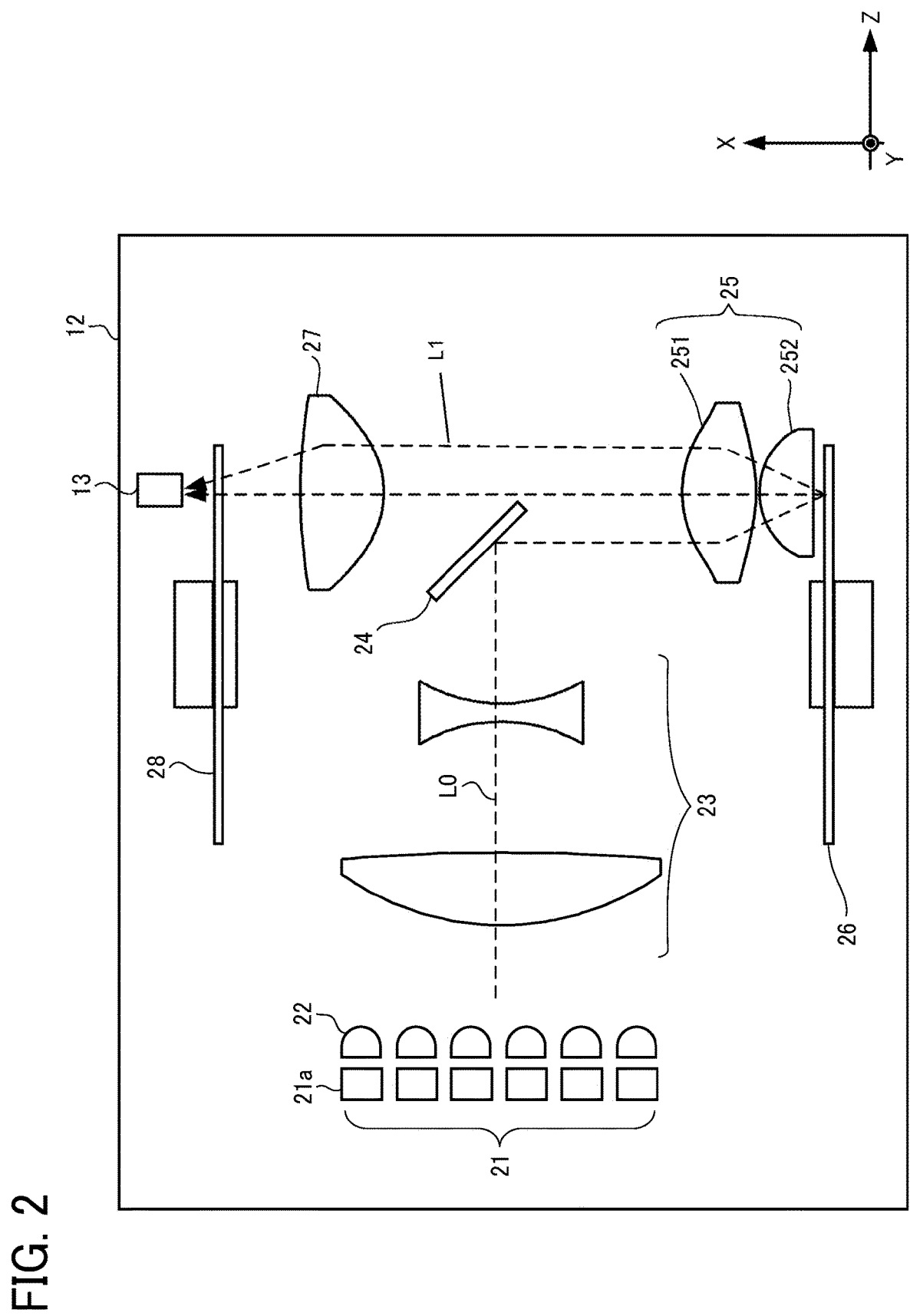
FIG. 2 is a diagram illustrating a configuration of a light-source device according to embodiments of the present disclosure.

As illustrated in FIG. 2, the light-source device 12 includes a laser beam source 21 that is a solid-state light source, a plurality of collimator lenses 22 that correspond to a plurality of light-emitting points 21a of the laser beam source 21, respectively, a first optical system 23, a dichroic mirror 24, a second optical system 25, a phosphor wheel 26, a condenser lens 27, and a color wheel 28. The collimator lenses 22, the first optical system 23, the dichroic mirror 24, the second optical system 25, the phosphor wheel 26, the condenser lens 27, and the color wheel 28 are arranged in line in the order listed as above with the laser beam source 21 as a starting point of the optical path.

The laser beam source 21 is a solid-state light source that emits the light in a wavelength band of blue, where the central wavelength in light-emission intensity is, for example, 455 nanometers (nm), as excitation light that optically excites the fluorescent material provided for the phosphor wheel 26. The blue laser beams that are emitted from the multiple laser beam sources 21 are linearly polarized light whose polarization state is constant, and are arranged so as to become S-polarized light when incident on the dichroic mirror 24. In the present embodiment, it is assumed that the central wavelength of the laser beams that are emitted from the multiple laser beam sources 21 is 455 nanometers (nm). However, no limitation is intended thereby, and the central wavelength of the laser beams that are emitted from the multiple laser beam sources 21 may have a varying wavelength as long as such laser beams can serve as excitation light for the phosphor wheel 26. In the present embodiment, it is assumed that the multiple light-emitting points 21a that serve as a plurality of point sources of light are arrayed and serve as the laser beam source 21. However, no limitation is intended thereby, and the laser beam source 21 may be configured by a single laser beam source or a plurality of laser beam sources that are arrayed. As illustrated in FIG. 2, the center line of the light flux that consists of a single or a plurality of laser beams is indicated by broken lines as a main light beam.

The excitation light L0 that is emitted from the multiple laser beam sources 21 is approximately collimated by the multiple collimator lenses 22 that correspond to the multiple light-emitting points 21a of the laser beam source 21, respectively. The approximately collimated excitation light L0 is incident on the first optical system 23. The optical axis of the first optical system 23 is arranged so as to pass through the center of the multiple light-emitting points 21a arrayed as the laser beam source 21. In other words, the optical axis of the first optical system 23 is arranged so as to match the main light beam.

The excitation light L0 that has passed through the first optical system 23 is reflected by the dichroic mirror 24, which serves as a reflection plane and is arranged at an angle of 45 degrees with reference to the optical axis of the first optical system 23. Moreover, the surface of the dichroic mirror 24 is coated so as to reflect the light of the wavelength band of the excitation light L0 and transmit the fluorescence generated by the fluorescent material of the phosphor wheel 26, as will be described later in detail. In the present embodiment, the dichroic mirror 24 that is shaped like a flat plate is arranged at an angle of 45 degrees with reference to the optical axis of the first optical system 23. However, no limitation is intended thereby, and a dichroic mirror of prism type may be used, or the angle of the dichroic mirror may be adjusted as desired. The optical path of the excitation light L0 that is reflected by the dichroic mirror 24 is turned by 90 degrees, and the excitation light L0 is incident on the second optical system 25. In the present embodiment, the optical axis of the first optical system 23 and the optical axis of the second optical system 25 are substantially decentered from each other.

Figure 3:
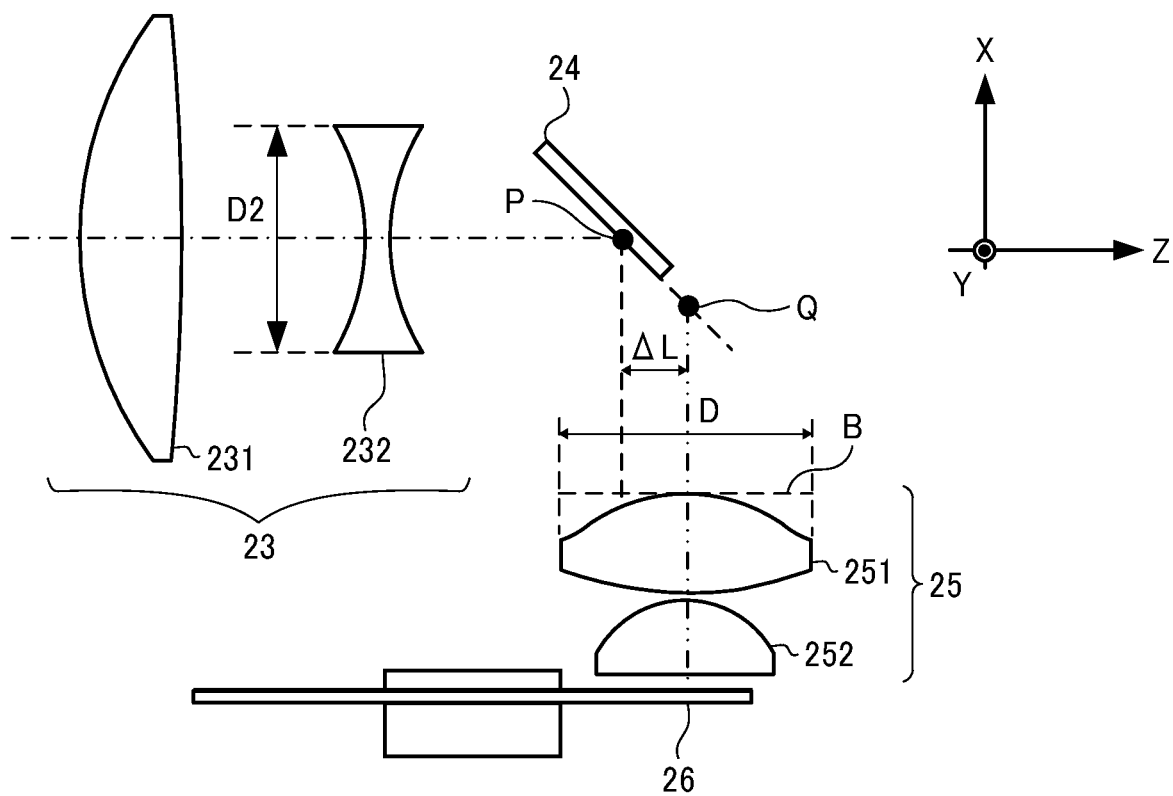
FIG. 3 is a diagram illustrating a configuration of a light-source optical system according to embodiments of the present disclosure.

A configuration or structure of such substantial decentering is described below in detail. As illustrated in FIG. 3, in the first optical system 23, the dichroic mirror 24 that is provided with a reflection plane, and the second optical system 25, when it is assumed that A indicates the plane that includes the incident plane of the dichroic mirror 24, and P indicates a point of intersection with the first optical system 23 on the plane A and Q indicates the point of intersection of the plane A and the second optical system 25, ΔL indicates the maximum distance on a plane orthogonal to the optical axis of the second optical system 25 between a first point of intersection P and a second point of intersection Q. In such a configuration, when the excitation light L0 that has passed through the central optical axis of the first optical system 23 is reflected by the dichroic mirror 24 and is incident on the second optical system 25, the excitation light L0 is decentered by an amount of decentering ΔL when viewed from optical-path side. In other words, the excitation light L0 that is reflected by the dichroic mirror 24 is decentered and incident on the second optical system 25. As described above, the geometrical shapes of the first optical system 23 and the second optical system 25 widely varies depending on the angle at which the dichroic mirror 24 that serves as a reflection plane is arranged or the optical design of the dichroic mirror 24, but the amount of decentering ΔL is substantially determined with reference to the optical path of the excitation light L0. Such an amount of decentering ΔL is satisfactory as long as the first optical system 23 and the second optical system 25 are decentered relative to each other.

Figure 4:
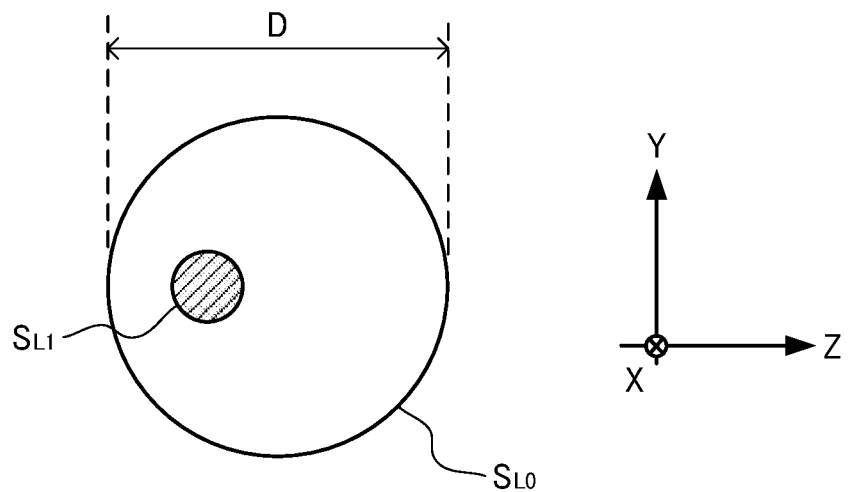
FIG. 4 is a diagram illustrating a projected image formed by laser beams on a plane B, in the configuration or structure as illustrated in FIG. 3.

In the present embodiment, the second optical system 25 is configured by a plurality of optical elements arranged between the dichroic mirror 24 and the phosphor wheel 26, and the second optical system 25 is a condensing optical system that has a positive power as a whole. Moreover, the second optical system 25 includes a lens 251 arranged on the most incident side, and a lens 252 arranged on the most light-exiting side. In other words, the lens 251 is an optical element that is arranged on the phosphor wheel 26 side, and the lens 252 is an optical element that is arranged on the dichroic mirror 24 side. D indicates the external diameter of the lens 251 that is an optical element arranged on the incident side of the second optical system 25, and B indicates a plane that includes the vertex of the surface of the lens 251 arranged on the incident side of the second optical system 25 and is orthogonal to the optical axis of the second optical system 25. On the optical path through which the excitation light L0 that is emitted from the multiple laser beam sources 21 heads for the phosphor wheel 26, as illustrated in FIG. 4, a projection image $S_{L0}$ that is formed on the plane B by the light flux of the excitation light L0 that passes through the plane B overlaps with a projection image $S_{L1}$ that is formed on the plane B as the light L1 of first color that returns as reflected by the phosphor wheel 26, as will be described later in detail, exits through the second optical system 25 on the incident side. In the present embodiment, the projection image $S_{L1}$ that indicates the dimension of the light flux of the light L1 of first color is hatched as the area in which the intensity becomes equal to or greater than $1/e^2$ of the peak intensity. It is desired that the surface of the lens 252 on the phosphor wheel 26 side be configured by a concave surface or a flat surface.

Figure 5:
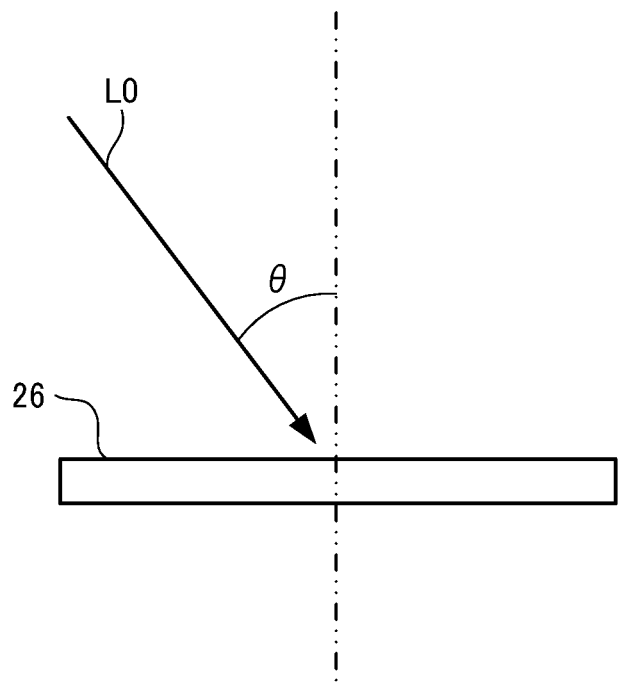
FIG. 5 is a diagram illustrating an incident angle on a wavelength converter, in the configuration or structure as illustrated in FIG. 2.

The phosphor wheel 26 is irradiated with the excitation light L0 that has passed through the second optical system 25. When the excitation light L0 is incident on and passes through the second optical system 25, the excitation light L0 is decentered by the second optical system 25. Accordingly, as a light beam is illustrated in FIG. 5, the excitation light L0 is obliquely incident on the phosphor wheel 26 at a tilt angle θ.

Figure 6A:
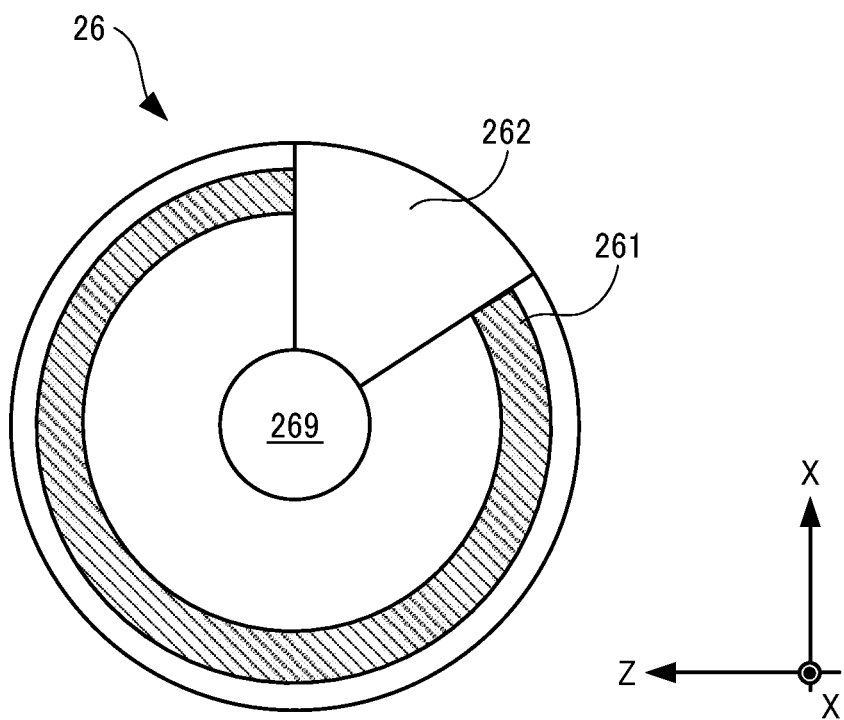
FIG. 6A and FIG. 6B are diagrams each illustrating a configuration of a wavelength converter according to embodiments of the present disclosure.

As illustrated in FIG. 6A, the phosphor wheel 26 is an optical element whose position irradiated with the excitation light L0 temporally changes a disc-like rotator is attached to a drive motor 269 and rotates at high speed. The phosphor wheel 26 includes a phosphor area 261 to which a fluorescent material is applied, and an excitation-light reflection area 262 that reflects the excitation light L0. The phosphor area 261 can convert the wavelength of the incident excitation light L0 into a wavelength of the fluorescence that the applied fluorescent material emits. In the present embodiment, a single phosphor area 261 and a single excitation-light reflection area 262 are assumed. However, no limitation is indicated thereby, and a plurality of excitation-light reflection areas 262 and a plurality of phosphor areas 261 may be provided. The types of the fluorescent material that is applied to the phosphor area 261 may be changed to achieve conversion into lights of various kinds of wavelengths.

Figure 6B:
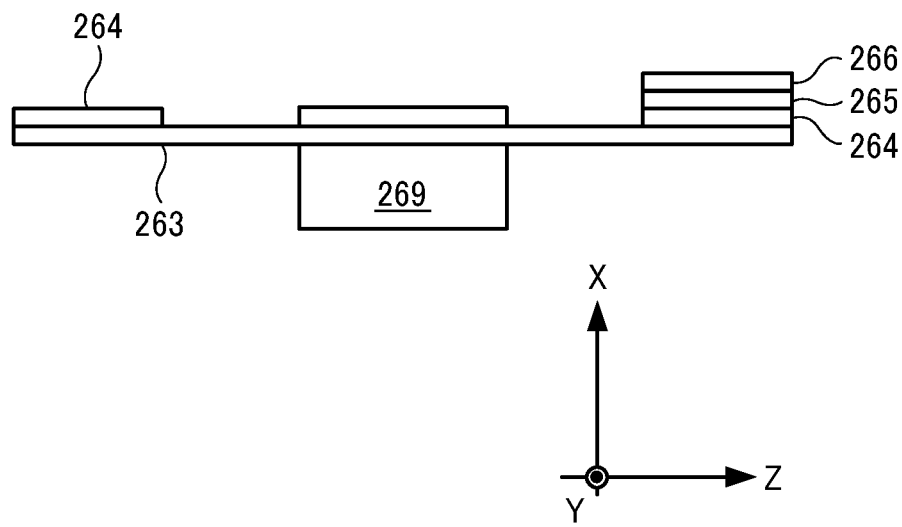

The sectional view of the phosphor wheel 26 is illustrated in FIG. 6B, and the phosphor wheel 26 includes a metal substrate 263, a reflective layer 264 formed on the metal substrate 263, a phosphor layer 265, and an antireflective coating 266. The reflective layer 264 serves as a reflective coating and reflects the light whose wavelength is within a wavelength range of the light emitted from the phosphor layer 265. In the present embodiment, the phosphor layer 265 is a layer to which rare-earth fluorescent materials such as a Ce:YAG materials are applied. The phosphor layer 265 absorbs the excitation light L0 in a wavelength band of blue, and emits a light of a wavelength band of different color such as yellow. However, no limitation is intended to such a configuration or structure as described above, and other various kinds of fluorescent material, phosphor, or nonlinear optical crystal may be adopted. The antireflective coating 266 reduces the reflection on a phosphor surface, and such an antireflective coating may be referred to as an AR coating. In the present embodiment, the metal substrate 263 is used. Accordingly, the reflection area 262 is configured only by the metal substrate 263, and the phosphor area 261 is configured by the substrate 263, the reflective layer 264, the phosphor layer 265, and the antireflective coating 266. However, no limitation is intended thereby. The metal substrate 263 may be configured by, for example, a transparent substrate, and the reflection area 262 may be coated with a reflective material.

When the reflective area 262 is irradiated with the excitation light L0, the excitation light L0 that has reached the phosphor wheel 26 is reflected as light L1 of first color in a wavelength 50 band of blue. In a similar manner to the above, when the phosphor area 261 is irradiated with the excitation light L0, the excitation light L0 is reflected as light L2 of second color in a wavelength band of yellow. As is apparent from FIG. 5, FIG. 6A, and FIG. 6B, as the phosphor wheel 26 rotates, the position of the phosphor wheel 26 that is irradiated with the excitation light L0 changes over time. In other words, the wavelength of the reflected light changes according to the position at which the phosphor wheel 26 is irradiated with light or the length of time for which the phosphor wheel 26 is irradiated with light. As described above, the phosphor wheel 26, which serves as a wavelength converter, reflects the light L1 of first color when the phosphor wheel 26 is irradiated with the excitation light L0 that includes the first light L1 of first color in a wavelength band of blue, and converts at least a part of the excitation light L0 into the second light L2 of second color in a wavelength band of yellow.

As the optical axis of a light beam that is reflected by the dichroic mirror 24 and then is incident on the second optical system 25 obliquely intersects with the optical axis of the second optical system 25, the light L1 of first color that is reflected by the phosphor wheel 26 passes and exits through a portion of the second optical system 25 on the opposite side across the optical axis compared with when the lights are incident on the second optical system 25. As described above, the light L1 of first color that has exited through the lens 251 of the second optical system 25 are guided to the condenser lens 27 so as not to hit the dichroic mirror 24.

The light L1 of first color and the light L2 of second color are incident on the condenser lens 27, and pass through the color wheel 28 and the light mixing element 13. After that, the light L1 of first color and the light L2 of second color go through, for example, the illumination optical system 14, the DMD 15, and the projection optical system 16, and are projected onto the screen 101.

The condenser lens 27 serves as a third optical system that has a positive power and guides the light L1 of first color and the light L2 of second color that have passed through the second optical system 25 to the light mixing element 13

Figure 7:
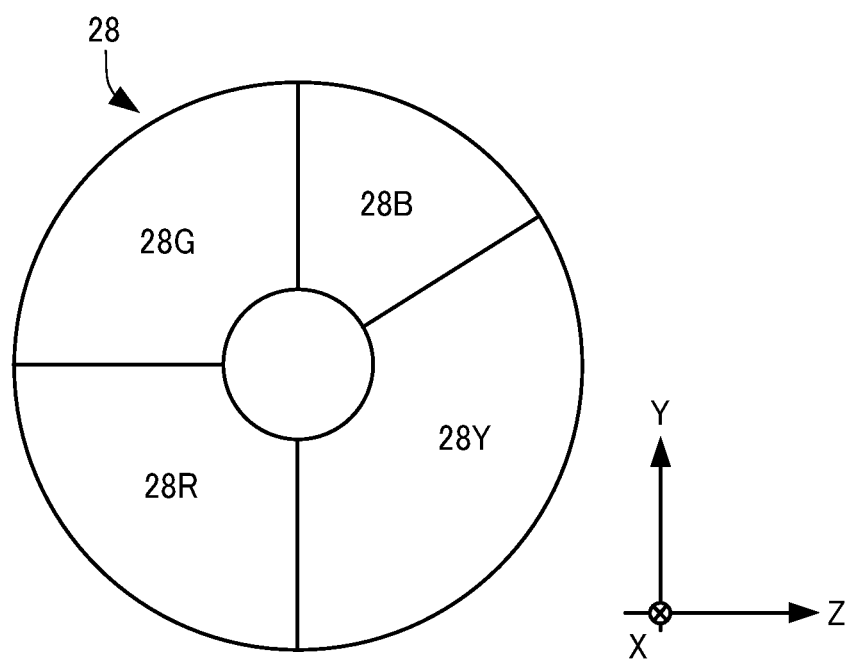
FIG. 7 is a diagram illustrating a configuration of a color wheel according to embodiments of the present disclosure.

In the present embodiment, as illustrated in FIG. 7, the color wheel 28 is a disc-like component that is divided into four areas including a blue area 28B, a yellow area 28Y, a red area 28R, and a green area 28G. The blue area 28B is rotated in synchronization with the position of the light that is reflected by the reflection area 262 of the phosphor wheel 26. In a similar manner to the above, each one of the yellow area 28Y, the red area 28R, and the green area 28G is arranged in synchronization with the light that is reflected by the phosphor area 261. As a transmissive diffuser panel is arranged on the blue area 28B, the coherence of the laser beam source 21 can be reduced, and the speckle patterns on the screen 101 can be reduced. As the yellow area 28Y has color properties similar to those of the light L2 of second color reflected by the phosphor area 261, the yellow area 28Y transmits the wavelength band as it is. Each one of the red area 28R and the green area 28G uses a dichroic mirror to reflect the light of unnecessary wavelength bands for the wavelength bands of yellow. As a result, a light of color with high purity can be obtained.

In the light-source device 12 as configured above, the second optical system 25 satisfies a mathematical expression 2 given below, which is referred to as a first conditional expression.

$$0 < \frac{\Delta L}{D} < 0.2 \qquad \text{[Math. 2]}$$

The first conditional expression is used to determine the amount of decentering ΔL for the first optical system 23 and the second optical system 25. If the value in the middle of the first conditional expression exceeds the upper limit, the size of the spot of the excitation light L0 on the phosphor wheel 26 tends to increase. In such cases, the outer-diameter size of the second optical system 25 needs to be increased. Moreover, undesired vignetting occurs on the light L1 of first color and the light L2 of second color in the middle of the second optical system 25, as will be described later in detail. Moreover, there is a possibility that the utilization efficiency of laser beams deteriorates. By contrast, if the value in the middle of the first conditional expression falls below the lower limit, the light L1 of first color that is incident on the phosphor wheel 26 tends to return to the light source side without sufficient separation. In such cases, for example, there is some concern that the utilization efficiency of laser beams deteriorates or the output power of the light source becomes unstable.

However, as long as the first conditional expression is satisfied, the value of D that indicates the outside diameter of the lens 251 of the second optical system 25 on the dichroic mirror 24 side falls within an appropriate range, and the value of ΔL that is an index for the displacement between the optical axis of the second optical system 25 and the optical axis of the main light beam of the excitation light L0 that in incident on the second optical system 25 falls within an appropriate range. Accordingly, the efficiency of a light-source optical system that adopts an excitation light source can be improved, and the size of such a light-source optical system can be reduced.

Figure 8:
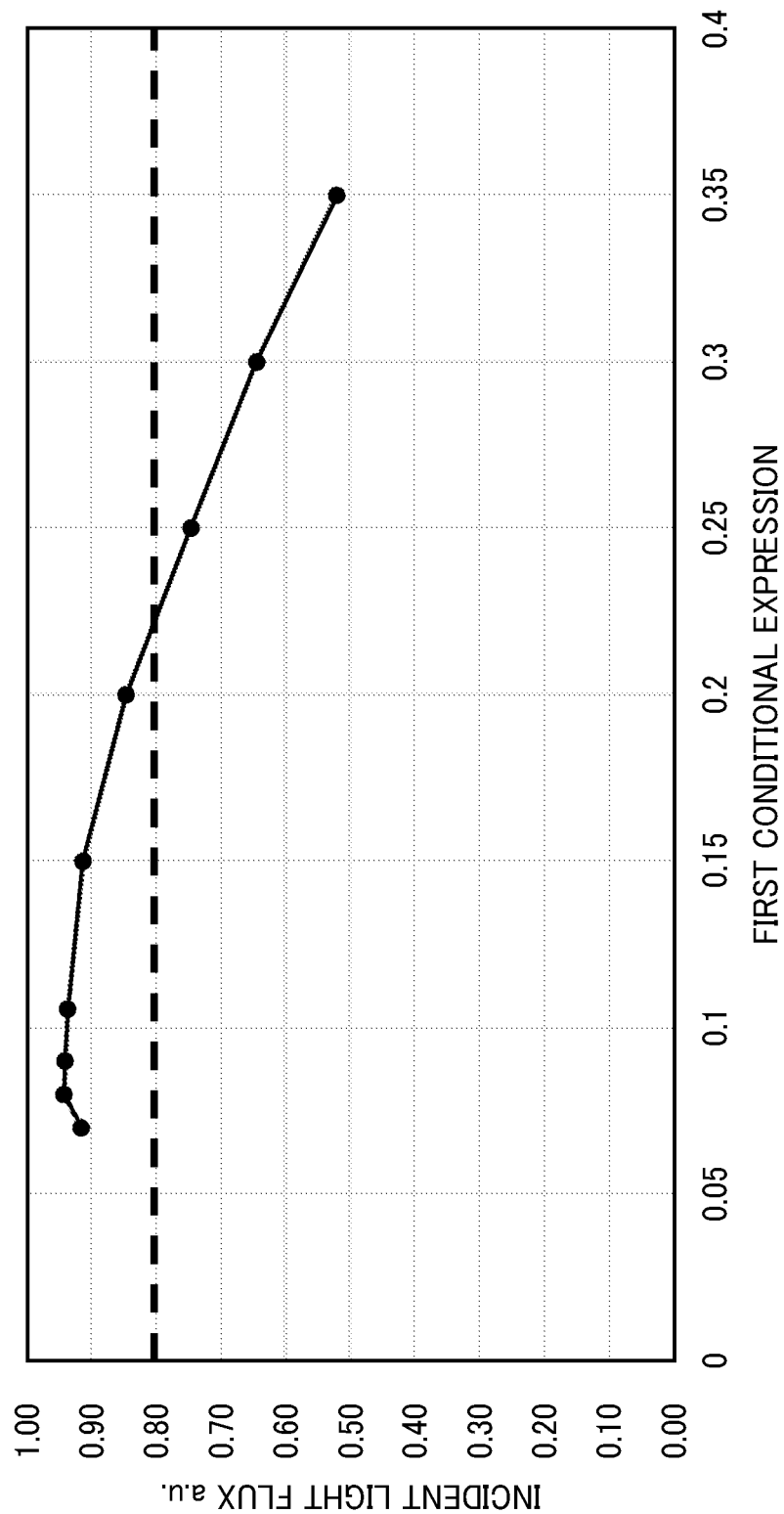
FIG. 8 is a drawing illustrating the relation between the value in the middle of a first conditional expression and the radiation intensity of a laser beam that is incident on the entrance of a light mixing element, according to embodiments of the present disclosure.

FIG. 8 is a drawing illustrating the relation between the value in the middle of the first conditional expression and the radiation intensity of the excitation light L0 that is incident on the entrance of the light mixing element 13, according to the present embodiment. A trend is understood from the drawing that, from a point at which the value in the middle of the first conditional expression exceeds the upper limit, the light flux that is incident on the entrance of the light mixing element 13 significantly deteriorates due to the changes in shape caused by the amount of decentering ΔL and an increase in reflectance ratio on the lens surface. It is also understood from the drawing that, when the value in the middle of the first conditional expression falls below the lower limit 0.05, the efficiency deteriorates due to, for example, vignetting occurring at the dichroic mirror 24.

As apparent from the graph of FIG. 8, it is further desired that the first conditional expression fall within the range as follows.

0.05<ΔL/D<0.2

When it is assumed that the incident angle of the excitation light L0 that includes the light L1 of first color and is incident on the phosphor wheel 26 that serves as a wavelength converter is θ, the incident angle θ satisfies a second conditional expression given below.

0°<|θ|<50°  [Math. 3]

The second conditional expression relates to the angles of incidence of the laser beams that are incident on the phosphor wheel 26. As known in the art, the laser beams that are incident on the phosphor wheel 26 diverge with a certain degree of width or angle, and it is not the case that the laser beams are incident on the phosphor wheel 26 with a specific angle as illustrated in some of the drawings. However, it is desired that equal to or more than 80% of the laser beams that are incident on the phosphor wheel 26 satisfy the second conditional expression. If the value in the middle of the second conditional expression exceeds the upper limit, in other words, when the incident angle θ increases to an excessive degree, the reflectivity of the laser beams on the surface of the first optical system 23 on the light-exiting side tends to increase, and the reflectivity on the surface of the phosphor wheel 26 tends to increase. For this reason, there is some concern that the conversion factor into the light L2 of second color decreases. By contrast, if the value in the middle of the second conditional expression falls below the lower limit, in other words, when the incident angle θ decreases to a too small degree, the light L1 of first color that is reflected by the phosphor wheel 26 tends to return to the side of the laser beam source 21 again through the dichroic mirror 24. For this reason, there is some concern that, for example, the output power of the laser beam source 21 becomes unstable.

It is desired that the surface of the optical elements of the second optical system 25 on the phosphor wheel 26 side be concave or planar. Due to such a configuration, not only the reflection of the light L1 of first color on the exit plane of the second optical system 25 can be reduced, and but also the reflection of the light L2 of second color on the incident plane of the second optical system 25 can be reduced. Accordingly, the efficiency improves.

When it is assumed that a plane B is the plane that is orthogonal to the optical axis of the second optical system 25 and includes the vertex of the surface of the second optical system 25 on the incident side, optical system is designed the present embodiment such that a projection area SU, where the light flux of the light L1 of first color on the optical path passes through the plane B, will be smaller than a quarter of a projection area $S_{L0}$ of the plane B that corresponds to the size of the lens 251 of the second optical system 25. In other words, the lens 251 of the second optical system 25 is sufficiently larger than the projection area $S_{L1}$ where the light L1 of first color on the optical path passes through the plane B. Due to such a configuration, the light flux of the light L1 of first color that is reflected or scattered by the phosphor wheel 26 and is exited through the second optical system 25 can sufficiently be separated from the light flux of the light L1 of first color that is incident on the second optical system 25.

Figure 9:
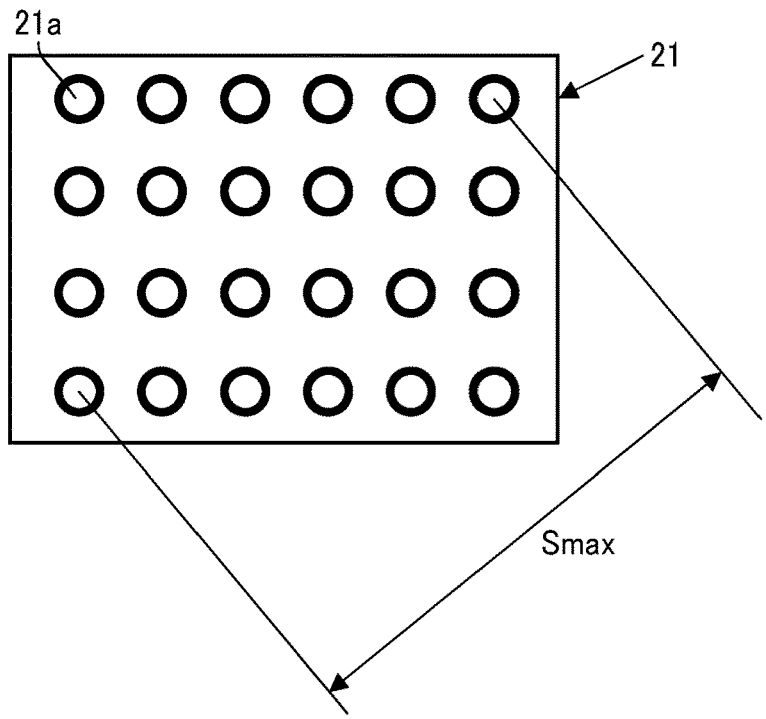
FIG. 9 is a diagram illustrating an arrangement of a light source that includes a plurality of light-emitting points, according to embodiments of the present disclosure.

In the present embodiment, the light-source device 12 includes the laser beam source 21 in which the multiple light-emitting points 21a are two-dimensionally arrayed, and the laser beam source 21 emits the excitation light L0 that includes the light L1 of first color. As illustrated in FIG. 9, when it is assumed that S max indicates the maximum distance between any pair of the multiple light-emitting points 21a that are two-dimensionally arrayed, it is desired that the maximum distance S max satisfy a third conditional expression given below.

$$\frac{S_{max}}{D} < 2 \qquad \text{[Math. 4]}$$

If the value in the middle of such a third conditional expression exceeds the upper limit, the reduction ratios of the first optical system 23 and the second optical system 25 need to be increased to achieve a desired size for the spot diameter of the light that is emitted to the phosphor wheel 26. However, there is some concern that the spot diameter of each one of the multiple light-emitting points 21a of the laser beam source 21 on the phosphor wheel 26 may decrease. In such a configuration, the density of light concentration tends to increase, and the conversion efficiency by the phosphor area 261 tends to deteriorate. In order to avoid such a situation, it is desired that the size of the laser beam source 21 be determined within range of the third conditional expression. By so doing, the conversion factor of the light-source device 12 can be improved, and the sizes of the first optical system 23 and the second optical system 25 can also be reduced.

Moreover, in the present embodiment, the light-source device 12 includes the multiple collimator lenses 22 that are arranged on the light exiting side of the multiple light-emitting points 21a of the laser beam source 21 on a one-to-one basis. In the present embodiment, it is assumed that the divergence angle of the multiple light-emitting points 21a is maximized in an X-direction, and a fourth conditional expression is satisfied as given below. In the fourth conditional expression, θx indicates the divergence angle in the X-direction. Moreover, Px indicates the pitches of the multiple light-emitting points 21a of the laser beam source 21 in the X-direction, and L indicates the distance between the multiple collimator lenses 22 and the face of the laser beam source 21 on the on the light exiting side.

$$0.5 < \frac{Px}{L \tan \theta x} < 2 \qquad \text{[Math. 5]}$$

When the fourth conditional expression is satisfied as described above, the distance between each pair of the multiple light-emitting points 21a is reduced, and the density of the profile of the laser beam source 21 increases as a whole. Accordingly, when the phosphor wheel 26 is irradiated with the light, a uniform profile can easily be obtained, and the conversion efficiency at the phosphor wheel 26 improves. If the value in the middle of the fourth conditional expression exceeds the upper limit, the spacing among the multiple light-emitting points 21a increases. In such cases, a reduction ratio needs to be increased to appropriately irradiate the phosphor wheel 26 with the light. By contrast, if the value in the middle of the fourth conditional expression falls below the lower limit, a uniform profile can easily be obtained on the phosphor wheel 26. However, it is undesired because, in addition to the light that is emitted from the multiple light-emitting points 21a that face the multiple collimator lenses 22 on a one-by-one basis, the light that is emitted from a neighboring one of the light-emitting points 21a tends to be incident on the phosphor wheel 26 as a stray light.

Furthermore, in the present embodiment, the phosphor wheel 26 includes a phosphor area 261 that serves as a wavelength conversion area and converts the excitation light L0 into the light L2 of second color, and a reflection area 262 that serves as a transmissive reflection area and reflects the excitation light L0 as the light L1 of first color. As the phosphor wheel 26 rotates, the phosphor wheel 26 can separate the received excitation light L0 that includes the light L1 of first color into first light L1 of first color in a wavelength band of blue and second light L2 of second color in a wavelength band of yellow in a switchable manner. Due to such a configuration, it is no longer necessary prepare a plurality of kinds of light sources of different colors in a separate manner, and the configuration or structure can easily be simplified or downsized.

Moreover, the incident plane side of the phosphor layer 265 of the phosphor wheel 26 may be provided with a coating film so as to reflect the excitation light L0 other than the light L1 of first color that has the wavelength bands that are absorbed by the phosphor layer 265. Due to such a configuration, a white light source that does not adopt a time-division method may be used as the light source.

Moreover, in the present embodiment, the phosphor wheel 26 is provided with a drive motor 269 that is coupled to the phosphor wheel 26. Such a drive motor 269 serves as a driver and rotates the phosphor wheel 26. Due to such a configuration, the position at which the phosphor wheel 26 irradiated with the excitation light changes over time. Accordingly, burn-in or the like due to concentration of the excitation light L0 onto one spot can be prevented, and the deterioration or the like of the phosphor wheel 26 due to heat can be prevented. Moreover, the brightness of the phosphor wheel 26 can be prevented from being saturated.

Moreover, in the present embodiment, the light-source device 12 includes a dichroic mirror 24. Through the use of the dichroic mirror 24, the optical path through which the light L1 of first color and the light L2 of second color is guided from the phosphor wheel 26 to the light mixing element 13 can be used in common without using a wave plate. Accordingly, the light-source optical system can be downsized.

In the present embodiment, the condenser lens 27 that has a positive power guides the light L1 of first color and the light L2 of second color that are reflected by the phosphor wheel 26 to the light mixing element 13. When it is assumed that the second optical system 25 and the condenser lens 27 have a combined magnifying power β, the combined magnifying power β satisfied a fifth conditional expression given below.

$$2.3 < |\beta| < 3.5 \qquad \text{[Math. 6]}$$

Figure 11:
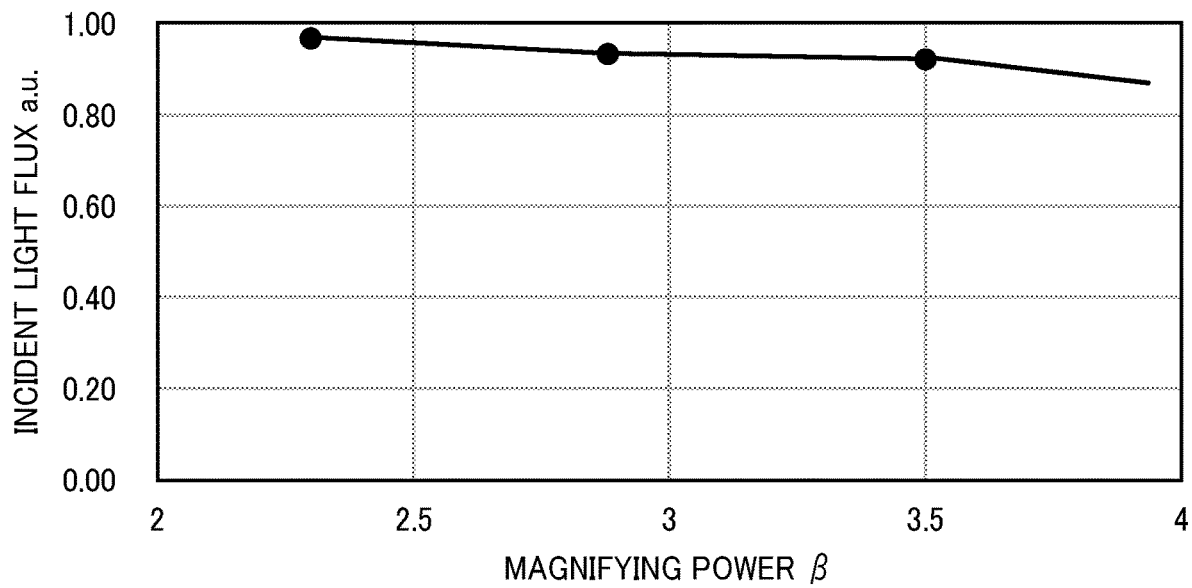
FIG. 11 is a diagram illustrating how the profile of light flux changes depending on a combined magnifying power of a second optical system and a third optical system, according to embodiments of the present disclosure.

The fifth conditional expression is a conditional expression that guides the light flux of the light L2 of second color to the light mixing element 13 in an efficient manner. As apparent from the graph of FIG. 11, if the value in the middle of the fifth conditional expression exceeds the upper limit, the angle of incidence decreases, and the image that is incident on the light mixing element 13 tends to increase in size. As a result, vignetting occurs on the light flux of laser beams, and the utilization efficiency of laser beams deteriorates. By contrast, if the value in the middle of the fifth conditional expression falls below the lower limit, an image that is formed at the entrance of the light mixing element 13 tends to decrease in size. In such a configuration, the amount of the light flux that is incident on the light mixing element 13 increases. However, the incident angle increases, and vignetting occurs on the laser beams in an optical system subsequent to the light mixing element 13. As a result, the utilization efficiency of laser beams deteriorates.

In the present embodiment, the light L1 of first color is a light in a wavelength band of blue, the light L2 of second color is a light in a wavelength band of yellow.

As described above, it is configured in the present embodiment that the first light L1 of first color is in a wavelength band of blue and the light L2 of second color is in a wavelength band of any one of red, yellow, and green. Due to such a configuration, the light is synthesized and the light of white color can be obtained.

Moreover, when the light L1 of first color is incident on the phosphor wheel 26, it is desired that at least 50% of the light L1 of first color is incident on the phosphor wheel 26 as P-polarized light. Due to such a configuration, the reflection on a surface of the phosphor wheel 26 can be prevented, and thus it is expected that the conversion factor of wavelength can be improved.

In a configuration of the present embodiment where the dichroic mirror 24 reflects the excitation light L0 when the excitation light L0 is incident on the dichroic mirror 24, it is further desired that at least 50% of the incident light be incident on the dichroic mirror 24 as S-polarized light. When the dichroic mirror 24 is configured to transmit the excitation light L0 as will be described later in detail, it is desired that at least 50% of the incident light be incident on the dichroic mirror 24 as P-polarized light. Due to such a configuration, the reflection on a surface of the dichroic mirror 24 can be prevented, and thus it is expected that the utilization efficiency of laser beams can be improved.

In the present embodiment, when it is assumed that the outer diameter of the optical element of the first optical system 23 on the light exiting side is $D_2$, a sixth conditional expression is satisfied as given below.

$$0.1 < \frac{D_2}{D} < 0.6 \qquad \text{[Math. 7]}$$

If the value in the middle of the sixth conditional expression exceeds the upper limit, it becomes difficult to separate the light in a wavelength band of blue, i.e., the light L1 of first color. By contrast, if the value in the middle of the sixth conditional expression falls below the lower limit, the degree of concentration of light increases. Accordingly, the energy density at a position where the phosphor wheel 26 is irradiated with the light increases, and a conversion factor into fluorescent light ends up deteriorating.

In the present embodiment, the light-source device 12 includes the laser beam source 21 that emits the excitation light L0 that includes the light L1 of first color, the phosphor wheel 26 that receives the excitation light L0 as incident light and converts at least a part of the excitation light L0 into the light L2 of second color that is different from the light L1 of first color, the dichroic mirror 24, and the second optical system 25 that has a positive power and serves as a condensing optical system. The dichroic mirror 24 and the second optical system 25 are arranged on the optical path between the laser beam source 21 and the phosphor wheel 26 in the order listed from the laser beam source 21 side. The dichroic mirror 24 reflects the light L1 of first color, and transmits the light L2 of second color. Alternatively, the dichroic mirror 24 transmits the light L1 of first color, and reflect the light L2 of second color. When it is assumed that R indicates a point of intersection of the main light beam of the light flux that is emitted from the laser beam source 21 and the plane A that includes the reflection plane of the dichroic mirror 24, T indicates a point of intersection of the plane A and the optical axis of the second optical system 25, ΔLO indicates the distance between R and T in a direction orthogonal to the optical axis of the second optical system 25, and that D indicates the external diameter of the lens 251 arranged on the incident side of the second optical system 25, a seventh conditional expression is satisfied as given below.

$$0 < \frac{\Delta LO}{D} < 0.2 \qquad \text{[Math. 8]}$$

Due to such a configuration, the main light beam of the laser beam source 21 and the optical axis of the second optical system 25 that serves as a condensing optical system are decentered from each other within range of the seventh conditional expression. Accordingly, the light L1 of first color that is reflected by the phosphor wheel 26 exits through a different side of the optical axis of the second optical system 25 compared with the instance when the light is incident on the second optical system 25. As described above, the light L1 of first color passes through a different optical path inside the second optical system 25 when the light exits the second optical system 25, compared with when the light is incident on the second optical system 25. Such a split of the optical path of the light L1 of first color contributes to the downsizing of the device.

Some concrete numerical examples of the present disclosure are given below. As a matter of course, the specific values that are given in the numerical examples below are given by way of example, and no limitation is intended by such values. The surface numbers in the tables indicates each surface, and the surface numbers for the aspherical surfaces are emphasized with asterisks (*) and the aspherical coefficients of such aspherical surfaces are depicted.

First Numerical Example

A first numerical example of the present disclosure is depicted in table 1 and table 2 given below. The aspherical coefficients of the surfaces that are emphasized with asterisks (*) in table 1 are depicted in table 2.

TABLE 1

| SURFACE NUMBER | R | D | Nd | Vd | GLASS MATERIAL | |
|---|---|---|---|---|---|---|
| 1 | ∞ | 2 | | | | FIRST |
| 2 | 30.02 | 8 | 1.7432 | 49.3394 | S-LAM60 | OHARA | OPTICAL |
| 3 | −211.312 | 15.5 | | | | SYSTEM |
| 4 | −17.456 | 2 | 1.48749 | 70.2363 | S-FSL5 | OHARA |
| 5 | 17.456 | 32.85 | | | | |
| 6* | 13.878 | 10.53 | 1.58913 | 61.1526 | L-BAL35 | OHARA | SECOND |
| 7* | −16.334 | 0.5 | | | | | OPTICAL |
| 8 | 9.222 | 7.7 | 1.62041 | 60.2896 | S-BSM16 | OHARA | SYSTEM |
| 9 | ∞ | 0.7 | | | | |
| 10 | 17.285 | 8.6 | 1.51633 | 64.142 | S-BSL7 | OHARA | CONDENSER |
| 11 | −50.077 | | | | | | LENS |

TABLE 2

|  | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

In the first numerical example, the amount of decentering (i.e., the amount of displacement) ΔL between the first optical system 23 and the second optical system 25 is 2.35 mm, and the external diameter D of the lens 251 of the second optical system 25 on the incident side is 23.5 mm. Moreover, the outer diameter D2 of the lens of the first optical system 23 on the light exiting side is 12.3 mm, and the combined magnifying power p of the second optical system 25 and the condenser lens 27 is 2.88.

Figure 10:
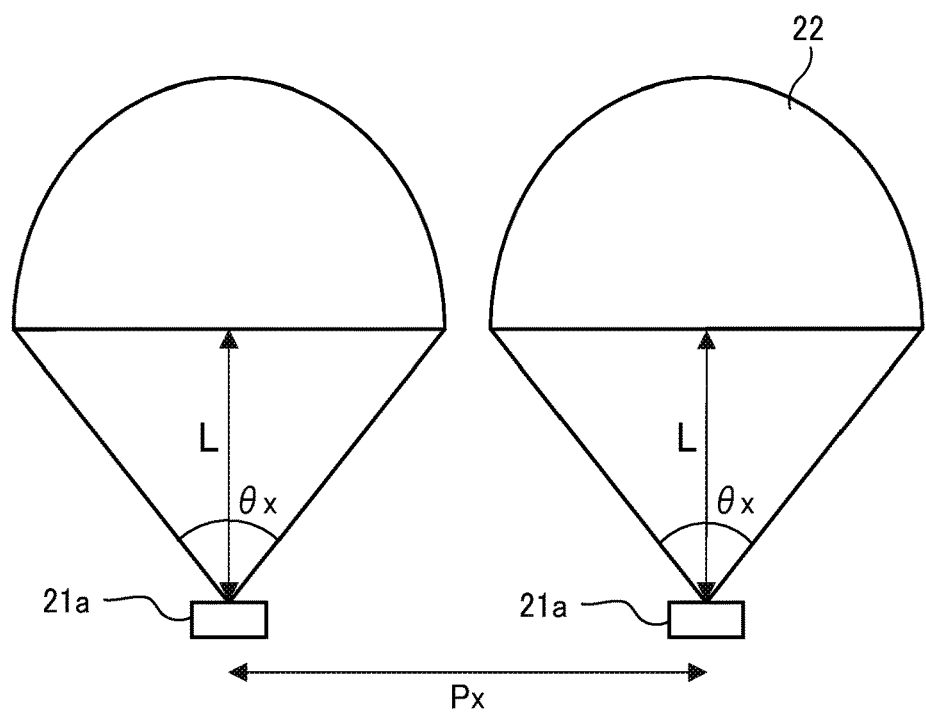
FIG. 10 is a diagram illustrating an arrangement of a light source that includes a plurality of light-emitting points, and a plurality of collimator lenses, according to embodiments of the present disclosure.

In the present embodiment, as illustrated in FIG. 9, a laser-diode (LD) light source in which the multiple light-emitting points 21a are two-dimensionally arrayed is adopted for the laser beam source 21. Alternatively, a metal block on which a plurality of laser diodes (LDs) are arranged, or a circuit board on which a plurality of laser-diode (LD) chips are arrayed, which is referred to as a multichip circuit, may be used as the laser beam source 21. In the present numerical example, the maximum distance S max among the multiple light-emitting points 21a of the laser beam source 21 corresponds to the distance of a diagonal line as illustrated in FIG. 8. Accordingly, it is assumed in the present numerical example that S max is 23 mm. As illustrated in FIG. 10, when it is assumed that the distance L to the multiple collimator lenses 22 is 4.3 mm and X denotes the direction of the maximum divergence angle of the laser diodes (LDs) that serve as the light-emitting points 21a, the divergence angle θx in the X-direction is 45 degrees, and the pitch Px of the multiple light-emitting points 21a in the X-direction is 6 mm.

Figure 12:
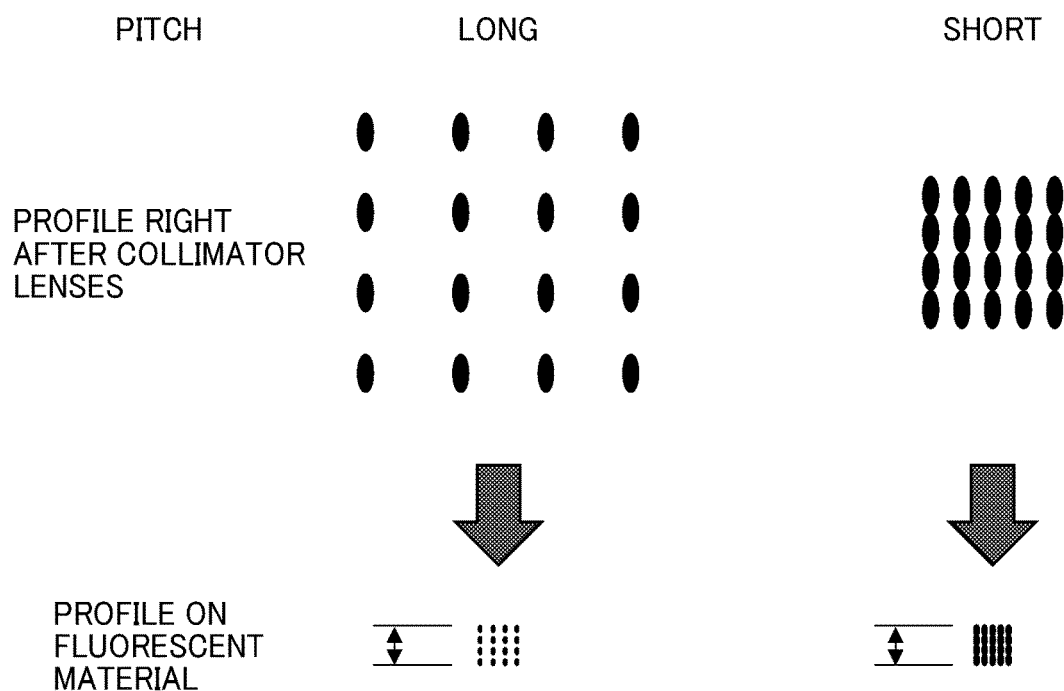
FIG. 12 is a schematic diagram illustrating the pitches of multiple light-emitting points and the beam profiles on a wavelength converter, according to embodiments of the present disclosure.

FIG. 12 is a diagram illustrating the profile of laser beams right after the collimator lenses 22 and the profile of laser beams incident on the phosphor wheel 26 when the pitches Px of the multiple light-emitting points 21a that are arranged in an array are changed, according to the present embodiment.

As apparent from the graph of FIG. 12, if the overall size of the profile of laser beams incident on the fluorescent material of the phosphor wheel 26 is to be constant, the scale-down factor of the optical system needs to be increased when the pitches are wide apart rather than narrow. However, there is a problem that, if the scale-down factor of the optical system is to be increased, the spot diameter of the light spots that correspond to the light-emitting points 21a tends to decrease in size on the phosphor wheel 26, and the density of light concentration increases and the conversion efficiency by the phosphor area 261 deteriorates. In order to avoid such a situation, it is desired that the pitch Px be determined within an appropriate range such that the space will be filled with the profile of the light spots on the fluorescent material. In the present embodiment, the pitch Px is set to a specific value of 6 mm. However, no limitation is indicated thereby, and the pitch Px may be changed as desired depending on, for example, the design of the optical system, differences in scale-down factor, and the size of the phosphor wheel 26. As described above, when the pitch Px of the light-emitting points 21a is determined within an appropriate range, a spatially even distribution is achieved on the phosphor wheel 26, and the conversion efficiency by the phosphor area 261 improves.

FIG. 13 is a diagram illustrating an intensity distribution of the laser beams of the excitation light L0 depending on a varying incident angle θ, according to the present numerical example.

As apparent from the graph of FIG. 13, in the present numerical example, the distribution of the angles of incidence θ of the laser beams within range where the intensity becomes equal to or greater than $1/e^2$ of the peak intensity ranges from 5 to 30 degrees. As described above, if the range of the incident angle θ of the excitation light L0 is satisfied as in the second conditional expression, the reflectivity by the surface of the second optical system 25 on the phosphor wheel 26 side can be controlled, and the utilization efficiency of laser beams improves.

FIG. 14 is a diagram illustrating the shape of the spot on the phosphor wheel 26 and the shape of the spot at the entrance of the light mixing element 13, according to the present numerical example.

As described above, in the present embodiment, a light tunnel whose slot size at the entrance is 3.4 mm×5.7 mm is used. Due to such a configuration, it is apparent from FIG. 14 that almost no vignetting occurs on the laser beams when the light flux of laser beams is incident on the light mixing element 13.

Second Numerical Example

A second numerical example of the present disclosure is depicted in third and fourth tables given below.

The aspherical coefficients of the surfaces that are emphasized with asterisks (*) in table 3 are depicted in table 4. In regard to the lens surfaces of the lenses in the optical system, the configuration or structure of the present numerical example is equivalent to that of the first numerical example, and only ΔL that indicates the displacements in optical axis between the first optical system 23 and the second optical system 25 is changed as follows. ΔL=3.5 mm

TABLE 3

| SURFACE NUMBER | R | D | Nd | Vd | GLASS MATERIAL | |
|---|---|---|---|---|---|---|
| 1 | ∞ | 2 | | | | FIRST OPTICAL SYSTEM |
| 2 | 30.02 | 8 | 1.7432 | 49.3394 | S-LAM60 OHARA | |
| 3 | −211.312 | 15.5 | | | | |
| 4 | −17.456 | 2 | 1.48749 | 70.2363 | S-FSL5 OHARA | |
| 5 | 17.456 | 32.85 | | | | |
| 6* | 13.878 | 10.53 | 1.58913 | 61.1526 | L-BAL35 OHARA | SECOND OPTICAL |
| 7* | −16.334 | 0.5 | | | | |

TABLE 3-continued

| SURFACE NUMBER | R | D | Nd | Vd | GLASS MATERIAL | | |
|---|---|---|---|---|---|---|---|
| 8 | 9.222 | 7.7 | 1.62041 | 60.2896 | S-BSM16 | OHARA | SYSTEM |
| 9 | ∞ | 0.7 | | | | | |
| 10 | 17.285 | 8.6 | 1.51633 | 64.142 | S-BSL7 | OHARA | CONDENSER |
| 11 | −50.077 | | | | | | LENS |

TABLE 4

| | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

TABLE 6

| | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

FIG. 15 is a diagram illustrating an intensity distribution of the laser beams of the excitation light L0 depending on a varying incident angle θ, according to the present numerical example.

Also in the present embodiment, the incident angle θ falls within an appropriate range of 10 to 40 degrees, and the second conditional expression be satisfied in a clear manner.

FIG. 16 is a diagram illustrating the shape of the spot on the phosphor wheel 26 and the shape of the spot at the entrance of the light mixing element 13, according to the present numerical example.

As understood from the drawing, almost no vignetting occurs on the laser beams when the laser beams are incident on the entrance of the light tunnel.

Third Numerical Example

A third numerical example of the present disclosure is depicted in table 5 and table 6 given below. The aspherical coefficients of the surfaces that are emphasized with asterisks (*) in table 5 are depicted in table 6. In regard to the lens surfaces of the lenses in the optical system, the configuration or structure of the present numerical example is equivalent to that of the first numerical example, and ΔL that indicates the displacements in optical axis between the first optical system 23 and the second optical system 25 is changed to 4.7 mm. Moreover, D2 that indicates the outer diameter of the optical element of the first optical system 23 on the light exiting side is changed to 14 mm.

FIG. 17 is a diagram illustrating an intensity distribution of the laser beams of the excitation light L0 depending on a varying incident angle θ, according to the present numerical example.

Also in the present numerical example, the intensity distribution falls within an appropriate range of 20 to 45 degrees, and the second conditional expression is satisfied in a clear manner.

FIG. 18 is a diagram illustrating the shape of the spot on the phosphor wheel 26 and the shape of the spot at the entrance of the light mixing element 13, according to the present numerical example.

As understood from the drawing, almost no vignetting occurs on the laser beams when the laser beams are incident on the entrance of the light tunnel.

Fourth Numerical Example

A fourth numerical example of the present disclosure is depicted in table 7 and table 8 given below. The aspherical coefficients of the surfaces that are emphasized with asterisks (*) in table 7 are depicted in table 8. In the present numerical example, the configuration of the lens surfaces of the lenses in the optical system is equivalent to that of the first numerical example except for the configuration or structure of the condenser lens 27 that corresponds to surface numbers 10 and 11. The amount of decentering (i.e., the amount of displacement) ΔL between the first optical system 23 and the second optical system 25 is 2.35 mm, and the external diameter D of the lens 251 of the second optical system 25 on the incident side is 23.5 mm. The combined magnifying power β of the second optical system 25 and the condenser lens 27 is 2.3.

TABLE 5

| SURFACE NUMBER | R | D | Nd | Vd | GLASS MATERIAL | | |
|---|---|---|---|---|---|---|---|
| 1 | ∞ | 2 | | | | | FIRST |
| 2 | 30.02 | 8 | 1.7432 | 49.3394 | S-LAM60 | OHARA | OPTICAL |
| 3 | −211.312 | 15.5 | | | | | SYSTEM |
| 4 | −17.456 | 2 | 1.48749 | 70.2363 | S-FSL5 | OHARA | |
| 5 | 17.456 | 32.85 | | | | | |
| 6* | 13.878 | 10.53 | 1.58913 | 61.1526 | L-BAL35 | OHARA | SECOND |
| 7* | −16.334 | 0.5 | | | | | OPTICAL |
| 8 | 9.222 | 7.7 | 1.62041 | 60.2896 | S-BSM16 | OHARA | SYSTEM |
| 9 | ∞ | 0.7 | | | | | |
| 10 | 17.285 | 8.6 | 1.51633 | 64.142 | S-BSL7 | OHARA | CONDENSER |
| 11 | −50.077 | | | | | | LENS |

TABLE 7

| SURFACE NUMBER | R | D | Nd | Vd | GLASS | MATERIAL | |
|---|---|---|---|---|---|---|---|
| 1 | ∞ | 2 | | | | | FIRST OPTICAL SYSTEM |
| 2 | 30.02 | 8 | 1.7432 | 49.3394 | S-LAM60 | OHARA | |
| 3 | −211.312 | 15.5 | | | | | |
| 4 | −17.456 | 2 | 1.48749 | 70.2363 | S-FSL5 | OHARA | |
| 5 | 17.456 | 32.85 | | | | | |
| 6* | 13.878 | 10.53 | 1.58913 | 61.1526 | L-BAL35 | OHARA | SECOND OPTICAL SYSTEM |
| 7* | −16.334 | 0.5 | | | | | |
| 8 | 9.222 | 7.7 | 1.62041 | 60.2896 | S-BSM16 | OHARA | |
| 9 | ∞ | 0.7 | | | | | |
| 10 | 14.687 | 10.00 | 1.51633 | 64.142 | S-BSL7 | OHARA | CONDENSER LENS |
| 11 | −35.429 | | | | | | |

TABLE 8

| | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

TABLE 10

| | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

Figure 19:
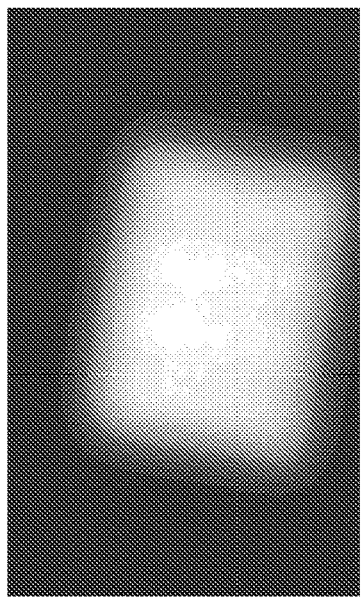
FIG. 19 is a diagram illustrating a spot shape of laser beams at the entrance of a light mixing element, according to a fourth numerical example of the present disclosure.

FIG. 19 is a diagram illustrating the shape of the spot at the entrance of the light mixing element 13, according to the present numerical example.

As understood from the drawing, almost no vignetting occurs on the laser beams when the laser beams are incident on the entrance of the light tunnel.

Fifth Numerical Example

A fifth numerical example of the present disclosure is depicted in table 9 and table 10 given below. The aspherical coefficients of the surfaces that are emphasized with asterisks (*) in table 9 are depicted in table 10. In the present numerical example, the configuration of the lens surfaces of the lenses in the optical system is equivalent to that of the first numerical example except for the configuration or structure of the condenser lens 27 that corresponds to surface numbers 10 and 11. The amount of decentering ΔL between the first optical system 23 and the second optical system 25 is 2.35 mm, and the external diameter D of the lens 251 of the second optical system 25 on the incident side is 23.5 mm. The combined magnifying power β of the second optical system 25 and the condenser lens 27 is 3.5.

Figure 20:
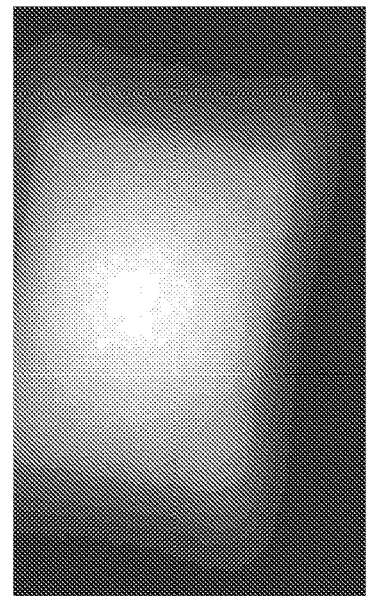
FIG. 20 is a diagram illustrating a spot shape of laser beams at the entrance of a light mixing element, according to a fifth numerical example of the present disclosure.

FIG. 20 is a diagram illustrating the shape of the spot at the entrance of the light mixing element 13, according to the present numerical example.

As is understood from FIG. 19, also in the present numerical example, almost no vignetting occurs on the laser beams when the laser beams are incident on the entrance of the light mixing element 13.

Sixth Numerical Example

Figure 21:
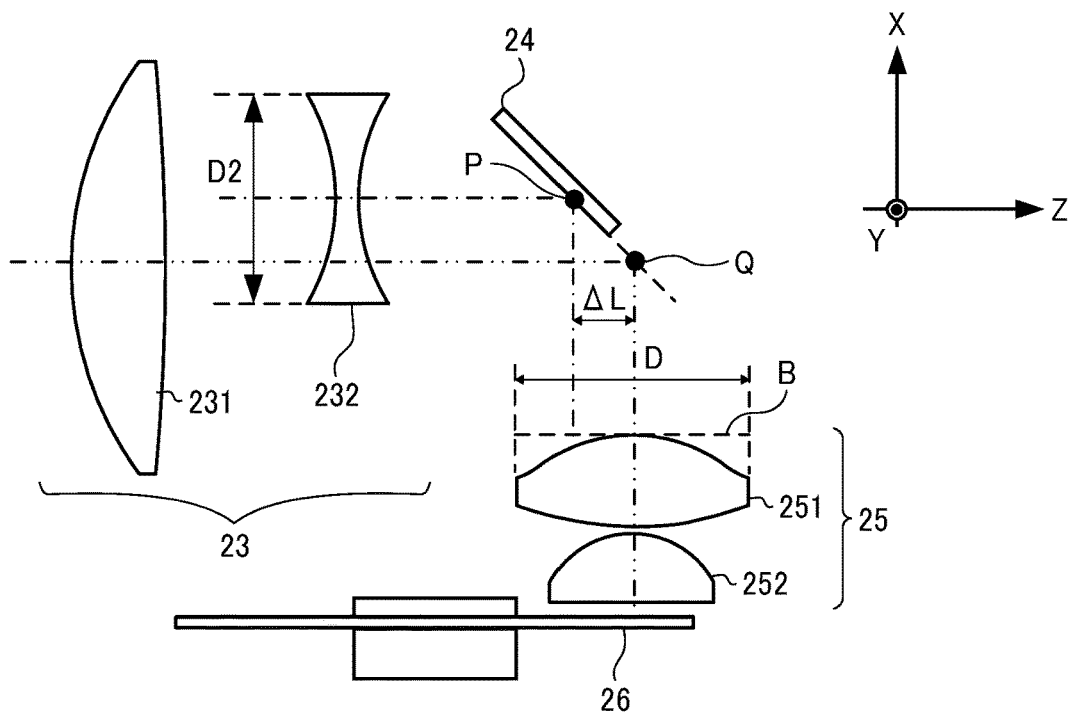
FIG. 21 is a diagram illustrating a configuration of a light-source optical system according to a sixth numerical example of the present disclosure.

As illustrated in FIG. 21, in the sixth numerical example of the present disclosure, the first optical system 23 is configured by a pair of lenses, and the optical axis of the lens 231 on the incident side is shifted from the optical axis of the lens 232 on the light exiting side. The amount of decentering in this configuration matches ΔL. Also in the configuration or structure according to the present numerical example of the present disclosure, as illustrated in FIG. 21, the first conditional expression is satisfied when the first point of intersection P and the second point of intersection Q are defined. Due to such a configuration, the optical system can be downsized as a whole. As described above, in order to achieve the amount of decentering ΔL, the first optical system 23 and the second optical system 25 may be arranged such that the optical axis of the lens 231 of the first optical system 23 on the incident side is orthogonal to the optical axis of the second optical system 25 at the second point of

TABLE 9

| SURFACE NUMBER | R | D | Nd | Vd | GLASS | MATERIAL | |
|---|---|---|---|---|---|---|---|
| 1 | ∞ | 2 | | | | | FIRST OPTICAL SYSTEM |
| 2 | 30.02 | 8 | 1.7432 | 49.3394 | S-LAM60 | OHARA | |
| 3 | −211.312 | 15.5 | | | | | |
| 4 | −17.456 | 2 | 1.48749 | 70.2363 | S-FSL5 | OHARA | |
| 5 | 17.456 | 32.85 | | | | | |
| 6* | 13.878 | 10.53 | 1.58913 | 61.1526 | L-BAL35 | OHARA | SECOND OPTICAL SYSTEM |
| 7* | −16.334 | 0.5 | | | | | |
| 8 | 9.222 | 7.7 | 1.62041 | 60.2896 | S-BSM16 | OHARA | |
| 9 | ∞ | 0.7 | | | | | |
| 10 | 14.687 | 10.00 | 1.51633 | 64.142 | S-BSL7 | OHARA | CONDENSER LENS |
| 11 | −35.429 | | | | | | | intersection Q of the reflection plane and B, and the optical axis of the lens 232 of the first optical system 23 on the light exiting side at the first point of intersection P of the reflection plane may be decentered by the amount of decentering ΔL, with reference to the second optical system 25.

TABLE 11

| SURFACE NUMBER | R | D | Nd | Vd | GLASS MATERIAL | | |
|---|---|---|---|---|---|---|---|
| 1 | ∞ | 2 | | | | | FIRST OPTICAL SYSTEM |
| 2 | 30.02 | 8 | 1.7432 | 49.3394 | S-LAM60 | OHARA | |
| 3 | −211.312 | 15.5 | | | | | |
| 4 | −17.456 | 2 | 1.48749 | 70.2363 | S-FSL5 | OHARA | |
| 5 | 17.456 | 32.85 | | | | | |
| 6* | 13.878 | 10.53 | 1.58913 | 61.1526 | L-BAL35 | OHARA | SECOND OPTICAL SYSTEM |
| 7* | −16.334 | 0.5 | | | | | |
| 8 | 9.222 | 7.7 | 1.62041 | 60.2896 | S-BSM16 | OHARA | |
| 9 | ∞ | 0.7 | | | | | |
| 10 | 17.285 | 8.6 | 1.51633 | 64.142 | S-BSL7 | OHARA | CONDENSER LENS |
| 11 | −50.077 | | | | | | |

TABLE 12

| | K | A4 | A6 | A8 |
|---|---|---|---|---|
| 6TH SURFACE | −0.5587 | 3.41E−05 | −2.47E−07 | −2.11E−09 |
| 7TH SURFACE | −10.8169 | 4.86E−05 | −6.31E−07 | 2.28E−09 |

The numerical values that are adopted for the first to seventh conditional expressions in the present numerical example will be described later in detail.

Seventh Numerical Example

Figure 22:
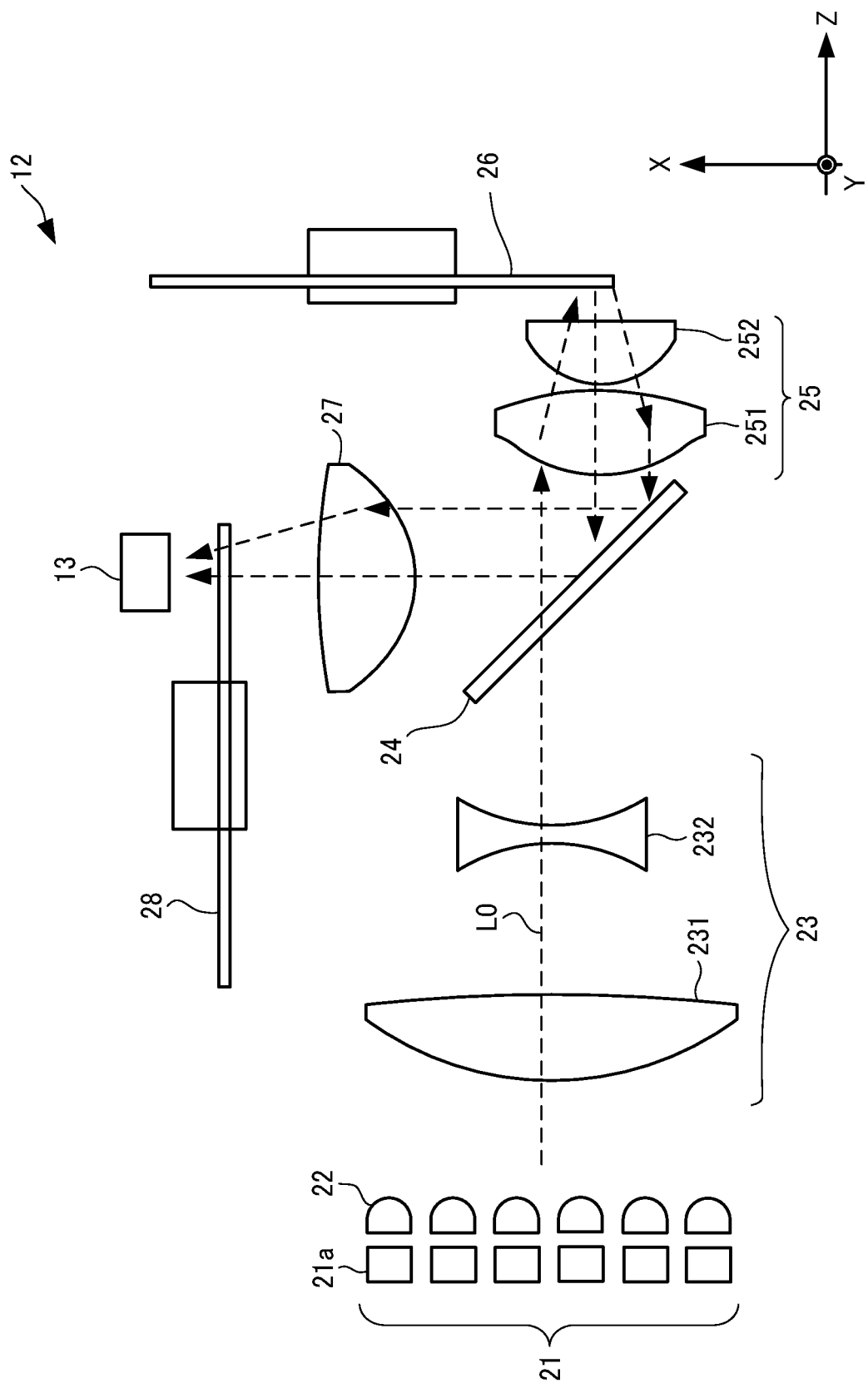
FIG. 22 is a diagram illustrating a configuration of a light-source optical system according to a seventh numerical example of the present disclosure.

FIG. 22 is a diagram illustrating a configuration of the light-source device 12 according to a seventh example of the present disclosure.

As apparent from the graph of FIG. 22, the excitation light L0 that is emitted from the laser beam source 21 and has passed through the first optical system 23 passes through the dichroic mirror 24 that serves as a reflection plane, and passes through the second optical system 25. Then, the excitation light L0 is reflected by the phosphor wheel 26 upon being separated into the light L1 of first color and the light L2 of second color. The light L1 of first color and the light L2 of second color, which are reflected as above, pass through the second optical system 25 again, and then are both reflected by the dichroic mirror 24. Then, the light L1 of first color and the light L2 of second color, which are reflected as above, pass through the condenser lens 27 and the color wheel 28, and are incident on the entrance of the light mixing element 13. The following optical system is equivalent to that as illustrated in FIG. 1, and thus its description is omitted.

In the present embodiment, the multiple light-emitting points 21a of the laser beam source 21 emit the light in a wavelength band of blue, where the central wavelength of the light-emission intensity is 455 nanometers (nm). In the present embodiment, the multiple light-emitting points 21a are arranged such that the emitted light becomes P-polarized light when incident on the dichroic mirror 24. In the present numerical example, the dichroic mirror 24 has a reflection plane, and is configured by two separate areas including a first area 241 and a second area 242. The first area 241, which is irradiated with the excitation light L0 that has passed through the first optical system 23, transmits the light in a wavelength band of blue out of the excitation light L0 that includes the light L1 of first color. The second area 242, which is irradiated with the light that has passed through the second optical system 25, reflects the light in a wavelength band of blue, which corresponds to the light L1 of first color, and reflects the light L2 of second color in a wavelength band of yellow, whose wavelengths are converted by the phosphor wheel 26. Moreover, both the first area 241 and the second area 242 are coated with dichroic coating so as to reflect the light L2 of second color. As a result, the first area 241 can transmit the light L1 of first color and reflect the light L2 of second color, as desired. In the present numerical example, the dichroic mirror 24 is configured as a plane. However, no limitation is indicated thereby, and the dichroic mirror 24 of prism type may be adopted.

Figure 23:
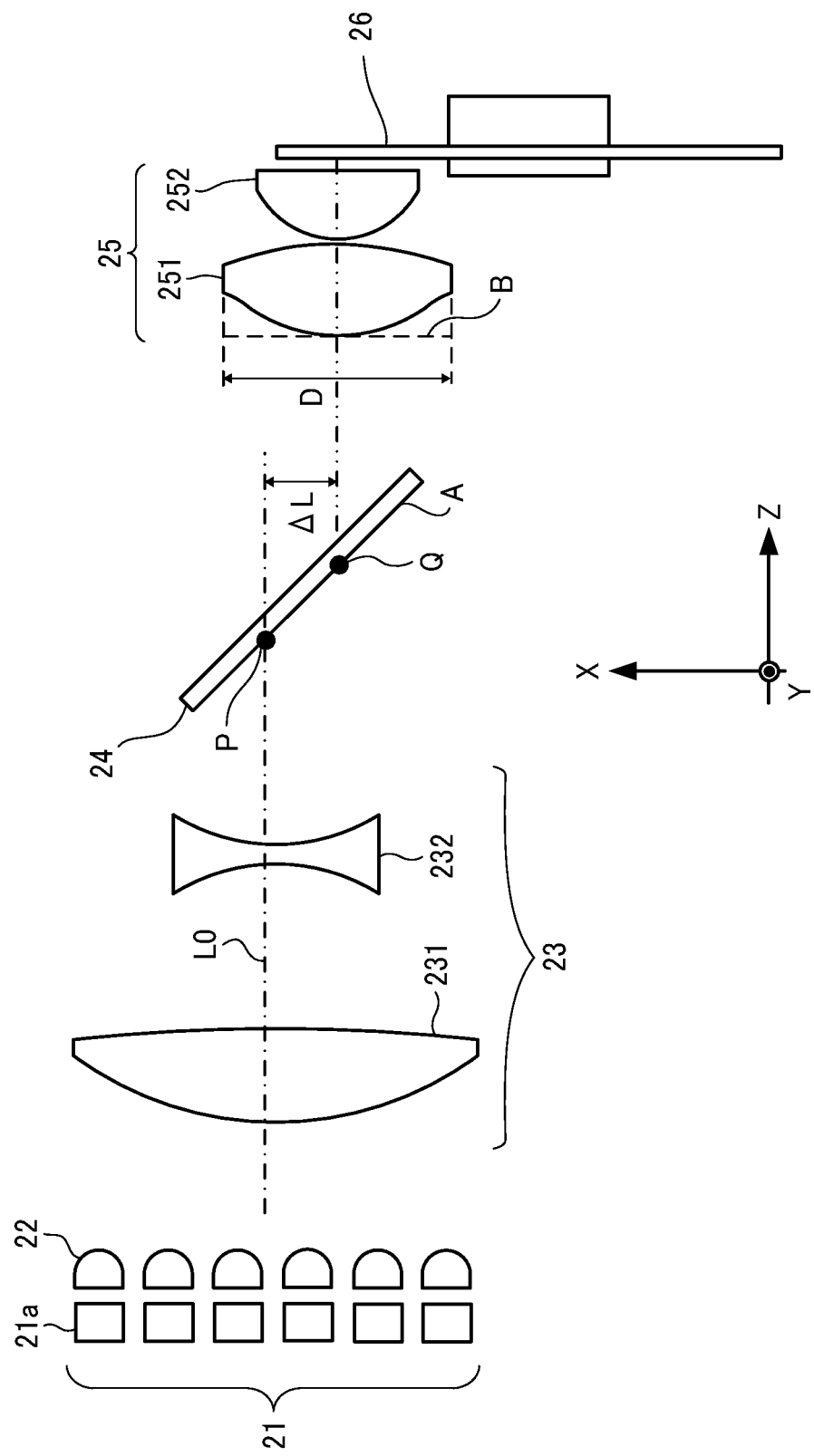
FIG. 23 is another diagram illustrating a configuration of a light-source optical system according to the seventh numerical example of the present disclosure.

Also in the present numerical example, optical axes of the first optical system 23 and the second optical system 25 are substantially decentered on the optical path. The amount of such decentering is defined as follow with reference to FIG. 23. When it is assumed that A indicates a plane that includes the surface of the dichroic mirror 24 on which the excitation light L0 is incident, P indicates a first point of intersection of the plane A and the optical axis of the first optical system 23, and Q indicates a second point of intersection of the plane A and the optical axis of the second optical system 25. The amount of decentering ΔL is equivalent to the maximum distance on a plane orthogonal to the optical axis of the second optical system 25 between the first point of intersection P and the second point of intersection Q. Due to such a configuration, as illustrated in FIG. 23 where some laser beams are schematically illustrated with broken lines, the phosphor wheel 26 is irradiated with the light that has passed through the second optical system 25 with oblique incidence with respect to the optical axis of the second optical system 25. Accordingly, when the light L1 of first color that passes through the second optical system 25, the light L1 of first color can take different optical paths between the following two instances, i.e., the instance before the phosphor wheel 26 is irradiated with the light and the instance after the light is reflected by the phosphor wheel 26.

The numerical values that are adopted for the first to seventh conditional expressions in the above seventh numerical example will be described later in detail.

Eighth Numerical Example

Figure 24:
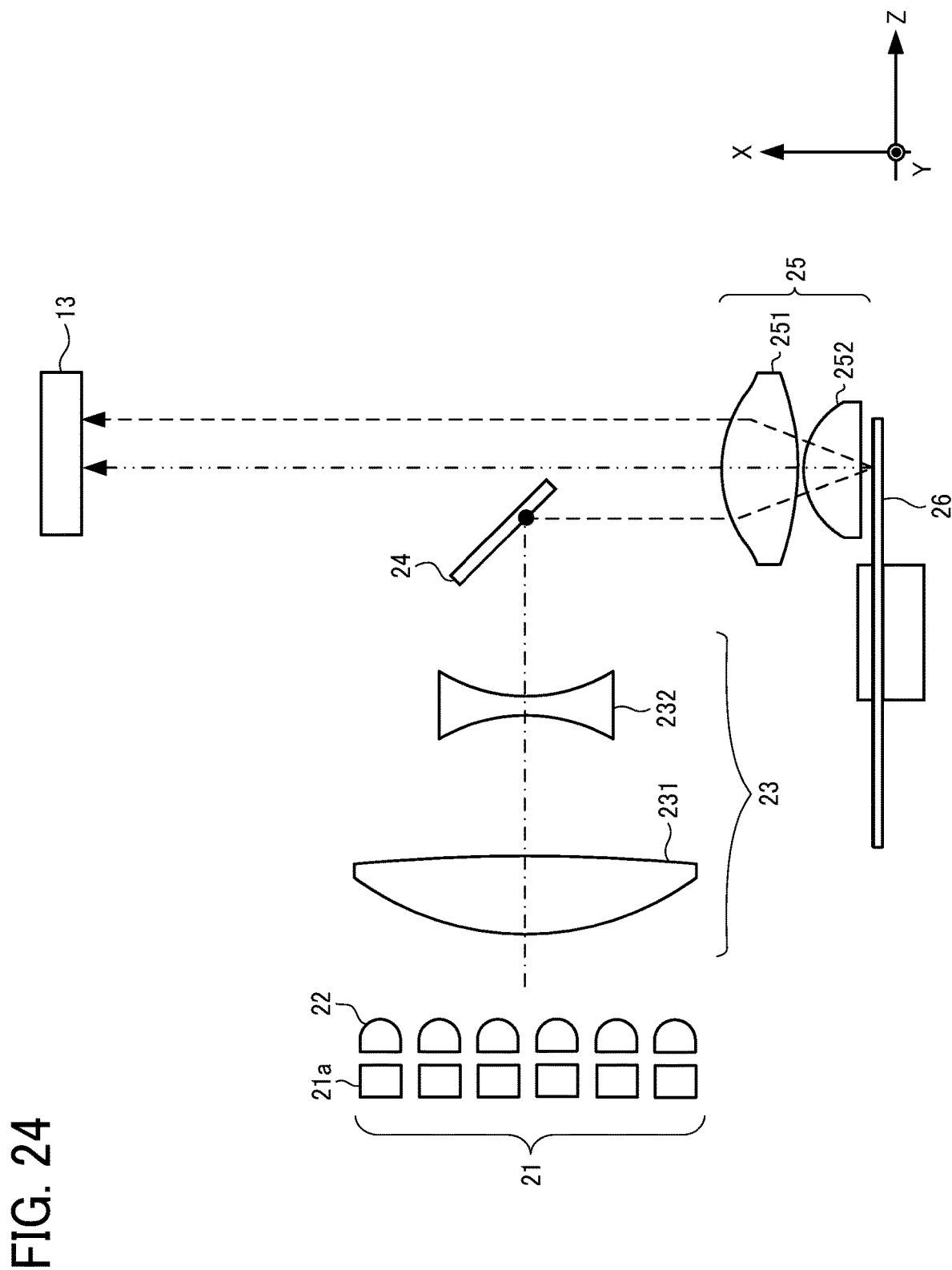
FIG. 24 is a diagram illustrating a configuration of a light-source optical system according to an eighth numerical example of the present disclosure.

FIG. 24 is a diagram illustrating a configuration of the light-source device 12 according to an eighth example of the present disclosure.

The present numerical example is different from the other numerical examples in two points that the color wheel 28 is not used and the condenser lens 27 is not used.

Figure 25A:
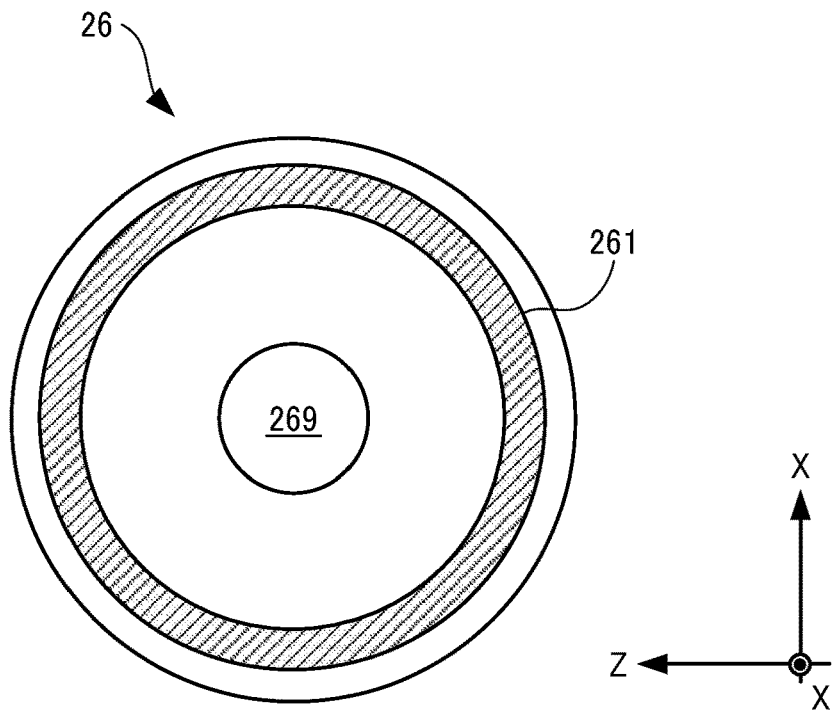
FIG. 25A and FIG. 25B are diagrams each illustrating a configuration of a wavelength converter according to the eighth numerical example of the present disclosure.
Figure 25B:
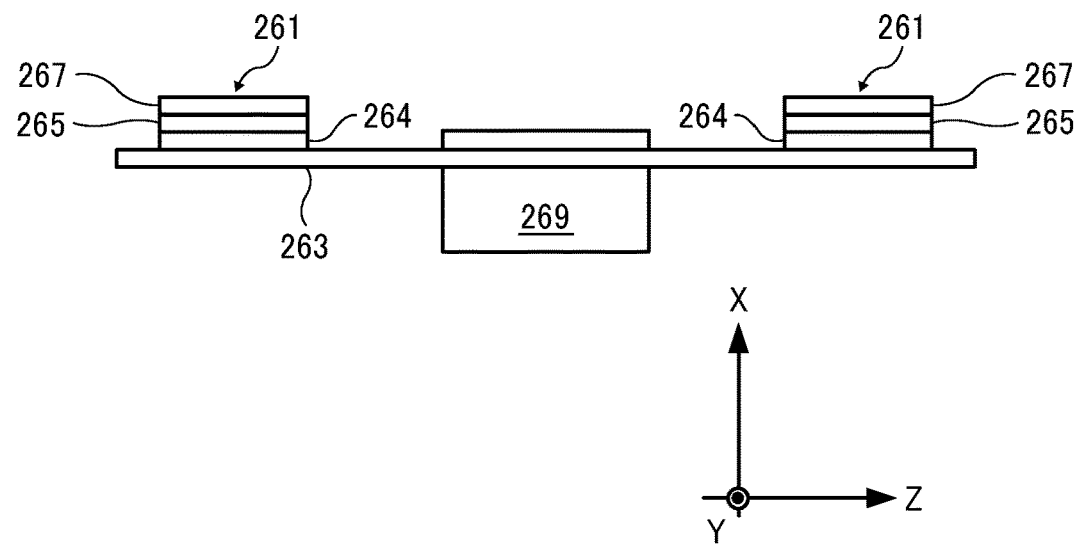

FIG. 25A and FIG. 25B are diagrams each illustrating a configuration or structure of the phosphor wheel 26 according to the present example.

The phosphor wheel 26 includes the phosphor area 261 that is shaped as a single circular band. As its sectional view is illustrated in FIG. 25A and FIG. 25B, the phosphor area 261 includes the metal substrate 263, a reflective layer 264 formed on the metal substrate 263, a phosphor layer 265, and a reflective coating 267 that transmits the light L1 of first color and the light L2 of second color but reflects the rest of light included in the excitation light L0. The reflective layer 264 serves as a reflective coating and reflects the light whose wavelength is within a wavelength range of the light emitted from the phosphor layer 265. The fluorescent materials or the like in the present numerical example are equivalent to those as described above in the above numerical examples of the present disclosure, and thus their description is omitted.

The excitation light L0 that is reflected by the phosphor wheel 26 includes the light L1 of first color, the light L2 of second color, and the other components of the excitation light L0, and passes through the second optical system 25 again and then is incident on the entrance of the light mixing element 13.

The numerical values that are adopted for the first to seventh conditional expressions in the above eighth numerical example will be described later in detail.

Ninth Numerical Example

FIG. 26 is a diagram illustrating a configuration of the light-source device 12 according to a ninth example of the present disclosure. Note that the present example serves as a modification of the above embodiment. Like reference signs are given to elements similar to those illustrated in, for example, FIG. 2, and the description of such elements is omitted.

Figure 27:
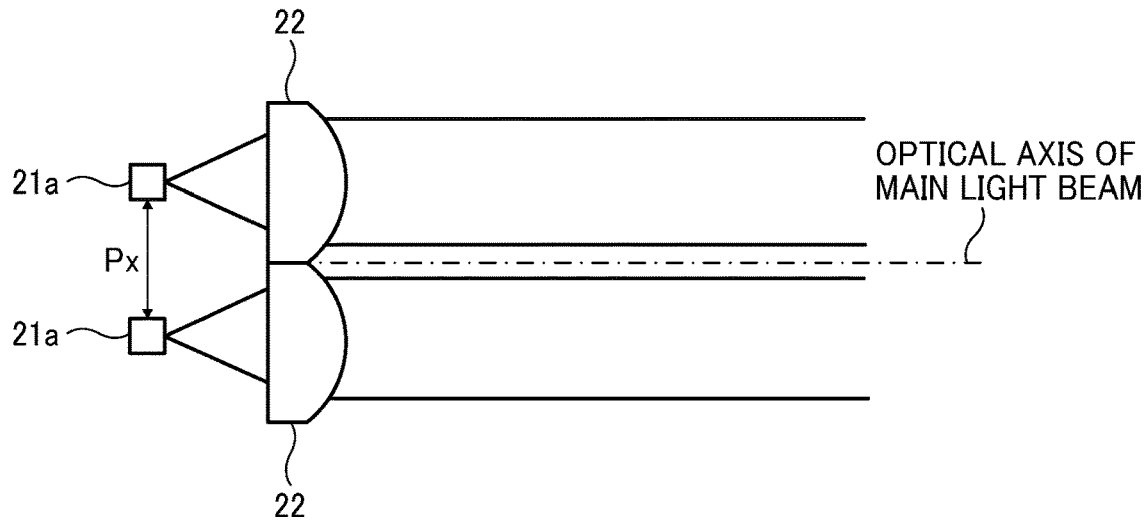
FIG. 27 is a diagram illustrating a configuration of a light source according to a ninth numerical example of the present disclosure.
Figure 28:
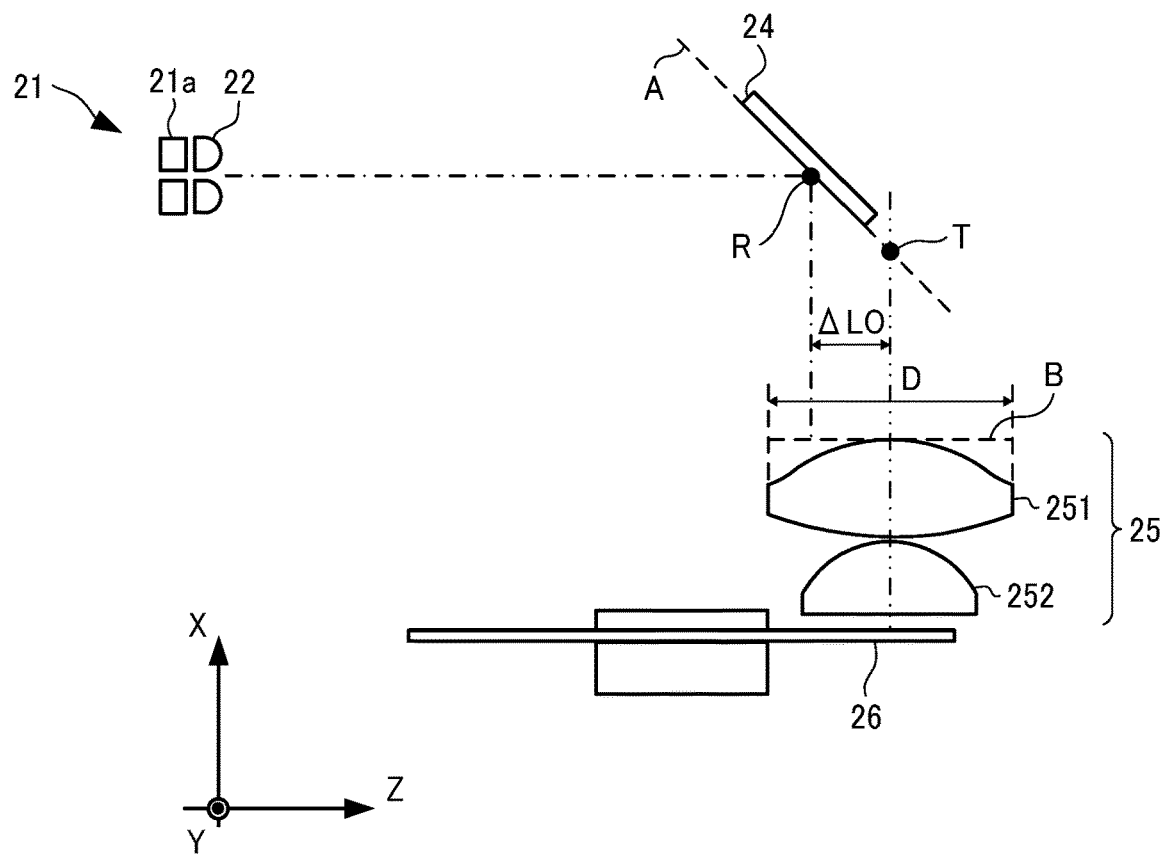
FIG. 28 is a diagram illustrating a light beam and a configuration or structure of a light-source optical system, according to the ninth numerical example of the present disclosure.

In the present numerical example, the first optical system 23, which guides the light that has exited through the collimator lenses 22 to the dichroic mirror 24, is not used. In the present numerical example, a vertical-cavity surface-emitting laser (VCSEL) light source that emits the excitation light L0 from each one of the multiple light-emitting points 21a is used as the laser beam source 21. The light that is emitted from the multiple light-emitting points 21a are approximately collimated by the collimator lenses 22, and then are incident on the dichroic mirror 24. When the VCSEL light source is used as in the present numerical example, as illustrated in FIG. 27, the light flux that is emitted from one of the light-emitting points 21a is sufficiently small, and the pitch Px between the light-emitting points 21a is sufficiently small. For this reason, the size of the irradiation on the phosphor wheel 26 can be reduced without using the first optical system 23. As in the configuration or structure as described above, the first optical system 23 can be omitted depending on the sizes of the phosphor wheel 26 and the light-emitting points 21a. In such a configuration, the center line of the light flux that is emitted from the VCSEL light source corresponds to the optical axis of the main light beam, and the seventh conditional expression is satisfied. R indicates a first point of intersection at which such an optical axis intersects with the plane A that includes the reflection plane of the dichroic mirror 24, and T indicates a second point of intersection at which the optical axis of the second optical system 25 intersects with the plane A that includes the reflection plane. ΔLO indicates the distance between R and T in a direction orthogonal to the optical axis of the second optical system 25, and D indicates the external diameter of the lens 251 arranged on the incident side of the second optical system 25.

A ninth numerical example of the present disclosure is depicted in table 13 and table 14 given below.

The aspherical coefficients of the surfaces that are emphasized with asterisks (*) in table 13 are depicted in table 14.

TABLE 13

| SURFACE NUMBER | R | D | Nd | Vd | GLASS MATERIAL | |  |
|---|---|---|---|---|---|---|---|
| 1* | 13.878 | 10.53 | 1.58913 | 61.1526 | L-BAL35 | OHARA | SECOND |
| 2* | −16.334 | 0.5 | | | | | OPTICAL |
| 3 | 9.222 | 7.7 | 1.62041 | 60.2896 | S-BSM16 | OHARA | SYSTEM |
| 4 | ∞ | 0.7 | | | | | |
| 5 | 17.285 | 8.6 | 1.51633 | 64.142 | S-BSL7 | OHARA | CONDENSER |
| 6 | −50.077 | | | | | | LENS |

TABLE 14

| | K | A4 | A6 | A8 |
|---|---|---|---|---|
| 1ST SURFACE | −0.5587 | 3.41E−05 | −2.47E−07 | −2.11E−09 |
| 2ND SURFACE | −10.8169 | 4.86E−05 | −6.31E−07 | 2.28E−09 |

In the ninth numerical example, the condensing optical system is composed of an aspherical lens and planoconvex lens each of which has a positive power, and the condenser lens 27 is a double-convex lens. In the present embodiment, the condenser lens 27 is arranged with the spacing of 32 mm from the vertex on the incident side of the excitation light L0 of the second optical system 25.

The numerical values that are adopted for the first to seventh conditional expressions in the above ninth numerical example will be described later in detail.

Tenth Numerical Example

Figure 29:
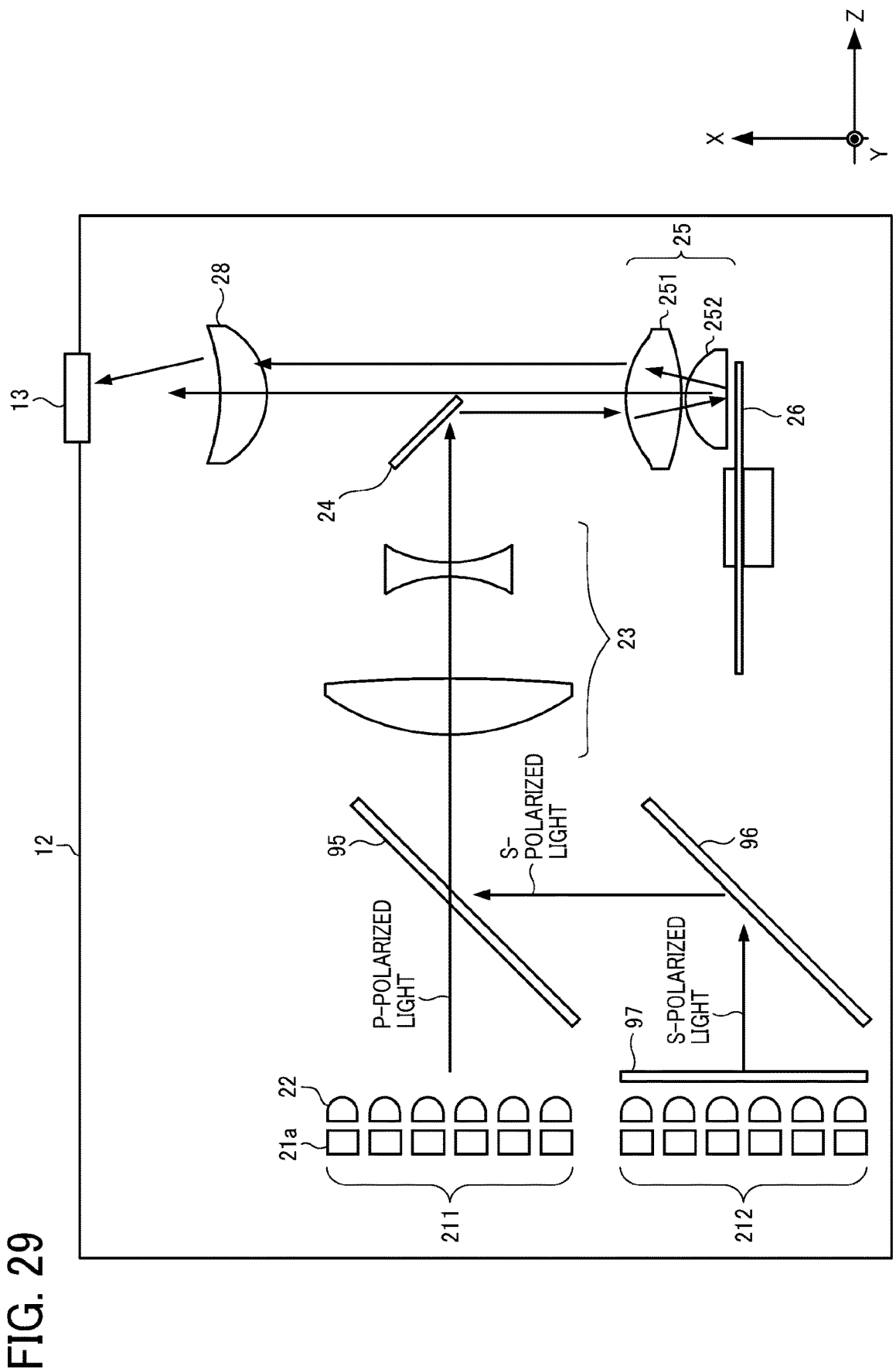
FIG. 29 is a diagram illustrating a configuration of a light-source optical system according to a tenth numerical example of the present disclosure.

FIG. 29 is a diagram illustrating a configuration of the light-source device 12 according to a tenth example of the present disclosure.

Like reference signs are given to elements similar to those illustrated in, for example, FIG. 2, and the description of such elements is omitted. In the present numerical example, the laser beam source 21 is provided with a pair of laser beam sources 211 and 212 on two separate circuit boards. Moreover, the light-source device 12 according to the present numerical example includes a half-wave plate 97 that is arranged in front of the laser beam source 212, a reflection mirror 96, and a polarization beam splitter (PBS) 95 that is arranged on the light exiting side of the laser beam source 211. In the present numerical example, all of the polarization directions of the laser beams that are emitted from the laser beam source 211 and the laser beam source 212 are equivalent to each other, and an arrangement is assumed in which, in particular, P-polarized light is emitted. The same applies to an arrangement in which S-polarized light is emitted. As the half-wave plate 97 and the reflection mirror 96 are arranged on the light exiting side of the laser beam source 212, the excitation light L0 that is emitted from the laser beam source 212 is converted from P-polarized light to S-polarized light and is reflected by the reflection mirror 96 and the polarization beam splitter 95, and then is incident on the first optical system 23. As the laser beams that are emitted from the laser beam source 211 are P-polarized light, such laser beams pass through the polarization beam splitter 95, and are incident on the first optical system 23. As described above, when the laser beam source 21 is provided with a pair of laser beam sources 211 and 212 on two separate circuit boards, the laser beam source 211 and the laser beam source 212 may take a different value for the maximum distance S max between any pair of the multiple light-emitting points 21a. In such cases, the larger one of the values of S max of the laser beam source 211 and the laser beam source 212 is to be adopted. In the present numerical example, two laser beam sources 211 and 212 that are equivalent to each other are used, and thus the same values as those of the first numerical example are applicable to the values of S max in the present numerical example.

The first to seventh conditional expressions in the above numerical examples and the variables in each of the conditional expressions are depicted in table 15-1 and table 15-2 given below.

TABLE 15-1

|  | FIRST EXAMPLE | SECOND EXAMPLE | THIRD EXAMPLE | FOURTH EXAMPLE | FIFTH EXAMPLE |
| --- | --- | --- | --- | --- | --- |
| $\varDelta L$ | 2.35 | 3.5 | 4.7 | 2.35 | 2.35 |
| D | 23.5 | 23.5 | 23.5 | 23.5 | 23.5 |
| D2 | 12.3 | 12.3 | 14 | 12.3 | 12.3 |
| Smax | 23 | 23 | 23 | 23 | 23 |
| Px | 6 | 6 | 6 | 6 | 6 |
| L | 4.3 | 4.3 | 4.3 | 4.3 | 4.3 |
| θx | 45 | 45 | 45 | 45 | 45 |
| FIRST CONDITIONAL EXPRESSION | 0.1 | 0.149 | 0.200 | 0.1 | 0.1 |
| SECOND CONDITIONAL EXPRESSION | $|\theta| < 28$ | $|\theta| < 37$ | $|\theta| < 45$ | $|\theta| < 28$ | $|\theta| < 28$ |
| THIRD CONDITIONAL EXPRESSION | 0.98 | 0.98 | 0.98 | 0.98 | 0.98 |
| FOURTH CONDITIONAL EXPRESSION | 1.40 | 1.40 | 1.40 | 1.40 | 1.40 |
| FIFTH CONDITIONAL EXPRESSION | 2.88 | 2.88 | 2.88 | 2.30 | 3.50 |
| SIXTH CONDITIONAL EXPRESSION | 0.523 | 0.523 | 0.596 | 0.523 | 0.523 |
| SEVENTH CONDITIONAL EXPRESSION | 0.10 | 0.15 | 0.20 | 0.10 | 0.10 |

TABLE 15-2

|  | SIXTH EXAMPLE | SEVENTH EXAMPLE | EIGHTH EXAMPLE | NINTH EXAMPLE | TENTH EXAMPLE |
| --- | --- | --- | --- | --- | --- |
| $\varDelta L$ | 2.35 | 2.35 | 2.35 | 2.35 | 2.35 |
| D | 23.5 | 23.5 | 23.5 | 23.5 | 23.5 |
| D2 | 12.3 | 12.3 | 12.3 | — | 12.3 |
| Smax | 23 | 23 | 23 | 4 | 23 |
| Px | 6 | 6 | 6 | 6 | 6 |
| L | 4.3 | 4.3 | 4.3 | 4.3 | 4.3 |
| θx | 45 | 45 | 45 | 45 | 45 |
| FIRST CONDITIONAL EXPRESSION | 0.1 | 0.1 | 0.1 | 0.1 | 0.1 |
| SECOND CONDITIONAL EXPRESSION | $|\theta| < 28$ | $|\theta| < 28$ | $|\theta| < 28$ | $|\theta| < 28$ | $|\theta| < 28$ |
| THIRD CONDITIONAL EXPRESSION | 0.98 | 0.98 | 0.98 | 0.17 | 0.98 |
| FOURTH CONDITIONAL EXPRESSION | 1.40 | 1.40 | 1.40 | 1.40 | 1.40 |

TABLE 15-2-continued

|  | SIXTH EXAMPLE | SEVENTH EXAMPLE | EIGHTH EXAMPLE | NINTH EXAMPLE | TENTH EXAMPLE |
| --- | --- | --- | --- | --- | --- |
| FIFTH CONDITIONAL EXPRESSION | 2.88 | 2.88 | — | 2.88 | 2.88 |
| SIXTH CONDITIONAL EXPRESSION | 0.523 | 0.523 | 0.523 | — | 0.523 |
| SEVENTH CONDITIONAL EXPRESSION | 0.10 | 0.10 | 0.10 | 0.10 | 0.10 |

In all of the numerical examples as described above, the first to seventh conditional expressions are satisfied in a clear manner.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims. For example, some of the elements described in the above embodiments may be removed. Further, elements according to varying embodiments or modifications may be combined as appropriate.

This patent application is based on and claims priority to Japanese Patent Application No. 2019-217523, filed on Nov. 29, 2019, in the Japan Patent Office, the entire disclosures of which are hereby incorporated by reference herein.

REFERENCE SIGNS LIST

L1 Light of first color
L2 Light of first color
26 Wavelength converter (phosphor wheel)
23 First optical system
24 Reflection plane (dichroic mirror)
25 Second optical system
27 Optical element (lens)
D External diameter optical element
θ Incident angle

The invention claimed is:

1. A light-source optical system comprising:
a wavelength converter on which light of first color is incident, the wavelength converter being configured to convert at least a part of the light of first color into light of second color different from the light of first color;
a first optical system disposed upstream from the wavelength converter on an optical path of the light of first color, the first optical system including a plurality of optical elements;
a reflection plane disposed downstream from the first optical system on the optical path; and
a second optical system disposed downstream from the reflection plane on the optical path, the second optical system including a plurality of optical elements and having a positive power as a whole,
wherein the reflection plane is configured to reflect one of the light of first color and the light of second color, and
wherein a conditional expression $$0 < \Delta L/D < 0.2$$

is satisfied,
where
P denotes a first point of intersection of an optical axis of at least one of the plurality of optical elements that together configure the first optical system and a plane including the reflection plane,
Q denotes a second point of intersection of an optical axis of the second optical system and the plane including the reflection plane,
ΔL denotes a distance between P and Q in a direction orthogonal to the optical axis of the second optical system, and
D denotes an external diameter of one of the plurality of optical elements disposed on an incident side of the second optical system.

2. The light-source optical system according to claim 1, wherein a conditional expression $$0° < |\theta| < 50°$$

is satisfied,
where
θ denotes an incident angle of the light of first color incident on the wavelength converter.

3. The light-source optical system according to claim 1, wherein the second optical system has a surface facing the wavelength converter, and the surface of the second optical system is concave or planar.

4. The light-source optical system according to claim 1, wherein, assuming a plane B that includes a vertex of a surface of the second optical system on the incident side and is orthogonal to the optical axis of the second optical system,
a projection area, where light flux of the light of first color on the optical path passes through the plane B, is smaller than a quarter of a projection area of the plane B corresponding to a size of surface of one of the plurality of optical elements of the second optical system on the incident side.

5. The light-source optical system according to claim 1, further comprising
an excitation light source including a plurality of light-emitting points,
wherein the plurality of light-emitting points are two-dimensionally arrayed to emit excitation light including the light of first color.

6. The light-source optical system according to claim 5, wherein a conditional expression $$S\,max/D < 2$$

is satisfied, where
S denotes a distance between any pair of the plurality of light-emitting points of the excitation light source, and
Smax denotes a maximum value of the distance S.

7. The light-source optical system according to claim 5, further comprising
a plurality of collimator lenses disposed on a light exiting side of the plurality of light-emitting points of the excitation light source on a one-to-one basis,
wherein the excitation light source has a largest divergence angle in an X-direction, and
wherein a conditional expression $$0.5 < Px/L \tan \theta x < 2$$

is satisfied, where
θx denotes the largest divergence angle in the X-direction,
Px denotes a pitch of the plurality of light-emitting points of the excitation light source in the X-direction, and
L denotes a distance between the plurality of collimator lenses and a surface of the excitation light source on a light exiting side.

8. The light-source optical system according to claim 5, wherein the wavelength converter includes:
a wavelength conversion area configured to convert the excitation light into the light of second color; and
a transmissive reflection area configured to transmit or reflect the light of first color.

9. The light-source optical system according to claim 5, wherein the wavelength converter includes a wavelength conversion area configured to convert the excitation light into the light of second color,
wherein the wavelength conversion area has a coating film on an incident side, and wherein the wavelength conversion area is configured to reflect at least a part of the excitation light.

10. The light-source optical system according to claim 5, further comprising
a driver coupled to the wavelength converter,
wherein the driver is configured to drive the wavelength converter to move an irradiation position of the excitation light on the wavelength converter over time.

11. The light-source optical system according to claim 1, further comprising
a third optical system disposed downstream from the second optical system on the optical path, the third optical system having a positive power,
wherein the third optical system is configured to guide the light of first color that is reflected by or transmitted through the wavelength converter and the light of second color emitted from the wavelength converter to a light mixing element, and
wherein a conditional expression $$2.3 < |\beta| < 3.5$$

is satisfied,
where
β denotes a combined magnifying power of the second optical system and the third optical system.

12. The light-source optical system according to claim 1,
wherein the light of first color is a light in a wavelength band of blue, and
wherein the light of second color is a light in a wavelength band of at least one of green, yellow, and red.

13. The light-source optical system according to claim 1, wherein at least 50% of the light of first color incident on the wavelength converter is P-polarized light.

14. The light-source optical system according to claim 1, wherein a conditional expression $$0.1 < D2/D < 0.6$$

is satisfied,
where
D2 denotes an outer diameter of one of the optical elements of the first optical system on a light exiting side.

15. A light-source device comprising:
an excitation light source configured to emit excitation light including a light of first color;
a wavelength converter on which the excitation light is incident, the wavelength converter being configured to convert at least a part of the excitation light into light of second color different from the light of first color;
a reflection plane; and
a condensing optical system having a positive power, the reflection plane and the condensing optical system being disposed on an optical path between the excitation light source and the wavelength converter in an order listed from the excitation light source side,
wherein the reflection plane is configured to reflect the light of first color and transmit the light of second color, or transmit the light of first color and reflects the light of second color, and
wherein a conditional expression $$0 < \Delta LO/D < 0.2$$

is satisfied,
where
R denotes a point of intersection of a main light beam of light flux emitted from the excitation light source and a plane A including the reflection plane,
T denotes a point of intersection of the plane A and an optical axis of the condensing optical system,
ΔLO denotes a distance between R and T in a direction perpendicular to the optical axis of the condensing optical system, and
D denotes an external diameter of an optical element disposed on an incident side of the condensing optical system.

16. An image display apparatus comprising:
the light-source device according to claim 15;
an image forming element configured to form an image; and
a projection optical system configured to magnify and project the image onto a projection plane.

* * * * *